United States Patent
Aybay et al.

(10) Patent No.: US 8,804,711 B2
(45) Date of Patent: *Aug. 12, 2014

(54) METHODS AND APPARATUS RELATED TO A MODULAR SWITCH ARCHITECTURE

(75) Inventors: Gunes Aybay, Los Altos, CA (US); Jaya Bandyopadhyay, San Jose, CA (US); Jean-Marc Frailong, Los Altos, CA (US); Pradeep Sindhu, Los Altos Hills, CA (US); Philip A. Thomas, San Jose, CA (US); Anjan Venkatramani, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 462 days.

This patent is subject to a terminal disclaimer.

(21) Appl. No.: 12/345,502

(22) Filed: Dec. 29, 2008

(65) Prior Publication Data

US 2010/0165984 A1 Jul. 1, 2010

(51) Int. Cl.
*H04L 12/58* (2006.01)
*H04L 12/56* (2006.01)

(52) U.S. Cl.
CPC .............. *H04L 49/15* (2013.01); *H04L 49/10* (2013.01); *H04L 49/45* (2013.01)
USPC ...................................... 370/388

(58) Field of Classification Search
None
See application file for complete search history.

(56) References Cited

U.S. PATENT DOCUMENTS

| | | | |
|---|---|---|---|
| 4,722,603 A | 2/1988 | Graebner et al. | |
| 5,138,615 A | 8/1992 | Lamport et al. | |
| 5,801,641 A | 9/1998 | Yang et al. | |
| 5,926,473 A | 7/1999 | Gridley | |
| 5,987,028 A | 11/1999 | Yang et al. | |
| 5,991,295 A | 11/1999 | Tout et al. | |
| 6,049,542 A * | 4/2000 | Prasad | 370/386 |
| 6,075,773 A | 6/2000 | Clark et al. | |
| 6,243,388 B1 | 6/2001 | Mussman et al. | |
| 6,539,027 B1 * | 3/2003 | Cambron | 370/442 |
| 6,614,236 B1 | 9/2003 | Karam | |
| 6,636,511 B1 | 10/2003 | Roy et al. | |

(Continued)

FOREIGN PATENT DOCUMENTS

EP 1 892 905 2/2008

OTHER PUBLICATIONS

Jonathan S. Turner et al. "Multirate Clos Networks" IEEE Communications Magazine, Oct. 2003, pp. 1-11.

(Continued)

*Primary Examiner* — John Blanton
(74) *Attorney, Agent, or Firm* — Cooley LLP

(57) ABSTRACT

In some embodiments, an apparatus includes a first housing, a second housing and at least one cable. The first housing includes a first interface card of a switch fabric. The second housing includes a second interface card of the switch fabric and a third interface card of the switch fabric. The second interface card of the switch fabric is operatively and physically coupled to the third interface card of the switch fabric via a midplane. The second interface card defines a plane that is nonparallel to the a plane defined by the third interface card and a plane defined by the midplane. The plane defined by the third interface card is nonparallel to the plane defined by the second interface card and the plane defined by the midplane. The cable is configured to operatively couple the first interface card to the second interface card.

18 Claims, 14 Drawing Sheets

(56) References Cited

U.S. PATENT DOCUMENTS

| | | | |
|---|---|---|---|
| 6,678,268 | B1 | 1/2004 | Francis et al. |
| 6,704,307 | B1 | 3/2004 | Graves et al. |
| 6,816,486 | B1 | 11/2004 | Rogers |
| 6,868,082 | B1 | 3/2005 | Allen, Jr. et al. |
| 7,038,135 | B1 | 5/2006 | Chan et al. |
| 7,173,931 | B2 | 2/2007 | Chao et al. |
| 7,229,020 | B2 | 6/2007 | Goodison et al. |
| 7,230,947 | B1 | 6/2007 | Huber et al. |
| 7,248,760 | B1 | 7/2007 | Corbalis et al. |
| 7,277,429 | B2 | 10/2007 | Norman et al. |
| 7,280,356 | B2 | 10/2007 | Pfahnl et al. |
| 7,406,038 | B1 | 7/2008 | Oelke et al. |
| 7,408,927 | B2 | 8/2008 | George |
| 7,415,034 | B2 | 8/2008 | Muller et al. |
| 7,496,252 | B1 | 2/2009 | Corbalis et al. |
| 7,505,458 | B2 | 3/2009 | Menon et al. |
| 7,552,262 | B1 * | 6/2009 | Turner et al. ............... 710/302 |
| 7,693,142 | B2 | 4/2010 | Beshai |
| 7,796,501 | B2 | 9/2010 | Oltman et al. |
| 7,899,930 | B1 * | 3/2011 | Turner et al. ............... 709/238 |
| 2002/0064170 | A1 | 5/2002 | Siu et al. |
| 2002/0181455 | A1 | 12/2002 | Norman et al. |
| 2003/0002541 | A1 | 1/2003 | Fowler et al. |
| 2004/0023558 | A1 | 2/2004 | Fowler et al. |
| 2005/0058128 | A1 | 3/2005 | Carson et al. |
| 2005/0275504 | A1 | 12/2005 | Torza |
| 2006/0013207 | A1 | 1/2006 | McMillen et al. |
| 2006/0126610 | A1 | 6/2006 | Ryan et al. |
| 2006/0165085 | A1 | 7/2006 | Konda |
| 2007/0016715 | A1 | 1/2007 | Phelps et al. |
| 2007/0140229 | A1 | 6/2007 | Tang |
| 2007/0153462 | A1 | 7/2007 | Crippen et al. |
| 2008/0044181 | A1 | 2/2008 | Sindhu |
| 2008/0112133 | A1 | 5/2008 | Torudbakken et al. |
| 2008/0130517 | A1 | 6/2008 | Lee et al. |
| 2008/0151863 | A1 | 6/2008 | Lawrence et al. |
| 2008/0159738 | A1 | 7/2008 | Lavranchuk |
| 2008/0186875 | A1 | 8/2008 | Kitani |
| 2008/0192648 | A1 | 8/2008 | Galles |
| 2008/0212472 | A1 | 9/2008 | Musacchio et al. |
| 2008/0214059 | A1 | 9/2008 | Rothermel et al. |
| 2008/0318465 | A1 | 12/2008 | Johnsen et al. |
| 2008/0320117 | A1 | 12/2008 | Johnsen et al. |
| 2009/0003327 | A1 | 1/2009 | Zang et al. |
| 2009/0028229 | A1 | 1/2009 | Cagno et al. |
| 2009/0175281 | A1 | 7/2009 | Higuchi et al. |
| 2010/0165843 | A1 | 7/2010 | Thomas |
| 2010/0165983 | A1 | 7/2010 | Aybay et al. |

OTHER PUBLICATIONS

Electronic design, "Optimized Interconnect Eliminates Limits in Orthogonal Architectures" [online] [originally retrieved on Nov. 5, 2008] Retrieved from the Internet: <URL: http://electronicdesign.com/Articles/Print.cfm?AD-1&ArticleID=13277>, (9 pgs).

H. Jonathan Chao et al. "Matching Algorithms for Three-Stage Bufferless Clos Network Switches" IEEE Communications Magazine, Oct. 2003, pp. 46-54.

Gunes Aybay et al., "Front-to-Back Cooling System for Modular Systems with Orthogonal Midplane Configuration" U.S. Appl. No. 12/167,604, filed Jul. 3, 2008, (25 pgs).

Search Report for European Application No. 09170037.7, mailed Dec. 10, 2009, 7 pages.

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

Office Action mailed May 25, 2010 for U.S. Appl. No. 12/345,500 (13 pages).

Office Action mailed Jun. 8, 2010 for U.S. Appl. No. 12/414,825 (17 pages).

U.S. Appl. No. 12/414,825, filed Mar. 31, 2009 entitled "Distributed Multi-stage Switch Fabric" (69 pgs).

U.S. Appl. No. 12/564,080, filed Sep. 22, 2009 entitled "Systems and Methods for Identifying Cable Connections in a Computing System" (51 pgs).

U.S. Appl. No. 12/613,313, filed Nov. 5, 2009 entitled "Methods and Apparatus for Upgrading a Switch Fabric" (63 pgs).

U.S. Appl. No. 12/752,704, filed Apr. 1, 2010 entitled "Apparatus and Methods Related to the Packaging and Cabling Infrastructure of a Distributed Switch Fabric" (39 pgs).

Office Action mailed Dec. 9, 2010 for U.S. Appl. No. 12/345,500 (15 pages).

Final Office Action mailed Jun. 22, 2011 for U.S. Appl. No. 12/345,500 (16 pages).

Final Office Action mailed Feb. 15, 2011 for U.S. Appl. No. 12/414,825 (24 pages).

Final Office Action mailed Jun. 21, 2011 for U.S. Appl. No. 12/414,825 (23 pages).

Office Action mailed Oct. 26, 2011 for U.S. Appl. No. 12/613,313 (16 pages).

Office Action mailed May 3, 2012 for U.S. Appl. No. 12/414,825.

Final Office Action mailed Jul. 19, 2012 for U.S. Appl. No. 12/613,313.

* cited by examiner

METHODS AND APPARATUS RELATED TO A MODULAR SWITCH ARCHITECTURE

RELATED APPLICATION

This application is related to a co-pending U.S. patent application bearing Ser. No. 12/345,500, entitled "System Architecture for a Scalable and Distributed Multi-Stage Switch Fabric," filed on even date herewith, which is incorporated herein by reference in its entirety.

BACKGROUND

Embodiments described herein relate generally to switch fabrics and more particularly, to the system architecture of distributed switch fabrics such as Clos networks.

Clos networks are multi-stage switch networks that provide non-blocking connections between multiple input ports and multiple output ports. A non-blocking network is a network in which a data path through the network can always be established between an idle input port and an idle output port.

A three-stage Clos network, for example, has a middle stage connected between an input stage and an output stage. Each stage includes multiple modules. Each input stage module has multiple input ports (n) and is operatively coupled to each middle stage module. Similarly, each output stage module has n output ports and is connected to each middle stage module. A three-stage network is strictly non-blocking if at least 2n−1 middle stage modules are present. In a strictly non-blocking configuration, a data path between an idle input port and an idle output port can always be established without rearranging the existing connections (i.e., the existing connections do not need to be rerouted through the switch fabric). A three-stage network is rearrangeably non-blocking if at least n middle stage modules are present. In a rearrangeably non-blocking configuration, a data path between an idle input port and an idle output port can always be established by rearranging the existing connections.

A distributed switch fabric having input stage modules with a large number of inputs/outputs and/or a switch fabric having a large number of stages has a many connections between each stage. Thus, a large number of cables are often required to connect the stages. Further, if the switch fabric is expanded such that additional inputs and/or stages are added to the switch fabric, the switch fabric typically is shut down and a large number of cables is reconfigured.

Thus, a need exists for a distributed switch fabric having fewer cable connections between stages. Further, a need exists for a distributed switch fabric that can expand to include additional inputs/outputs and/or stages without significantly increasing the cabling and/or without having to shut down during expansion.

SUMMARY

In some embodiments, an apparatus includes a first housing, a second housing and at least one cable. The first housing includes a first interface card of a switch fabric. The second housing includes a second interface card of the switch fabric and a third interface card of the switch fabric. The second interface card of the switch fabric is operatively and physically coupled to the third interface card of the switch fabric via a midplane. The second interface card defines a plane that is nonparallel to the a plane defined by the third interface card and a plane defined by the midplane. The plane defined by the third interface card is nonparallel to the plane defined by the second interface card and the plane defined by the midplane. The cable is configured to operatively couple the first interface card to the second interface card.

DETAILED DESCRIPTION

Figure 1:
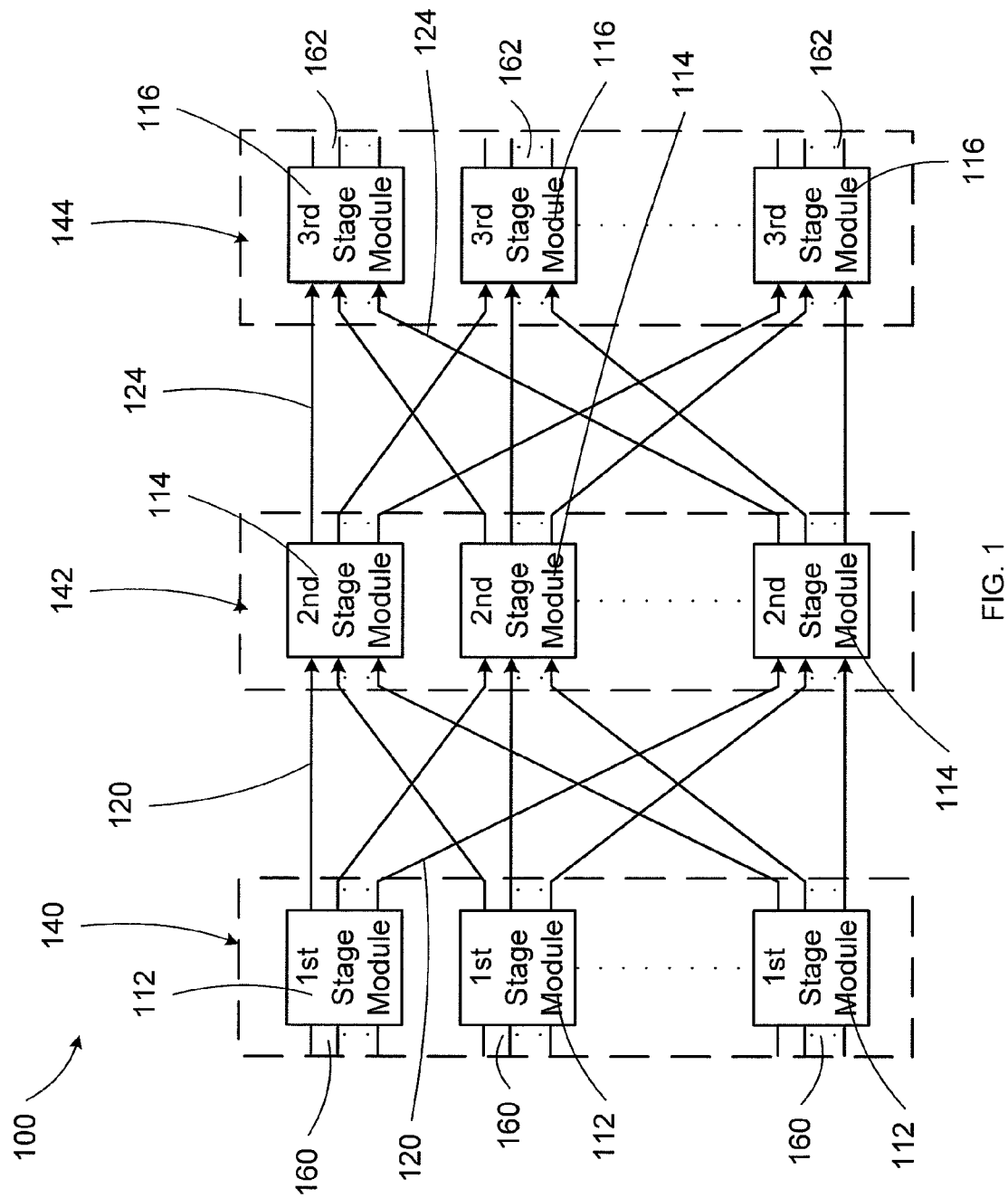
FIG. 1 is a schematic illustration of a switch fabric, according to an embodiment.

In some embodiments, an apparatus includes a first housing, a second housing and at least one cable. The first housing includes a first interface card of a switch fabric. In some embodiments, the first interface card is associated with a first stage and a fifth stage of the switch fabric. The second housing includes a second interface card of the switch fabric and a third interface card of the switch fabric. In some embodiments, the second interface card is associated with a second stage and a fourth stage of the switch fabric and the third interface card is associated with a third stage of the switch fabric. The second interface card of the switch fabric is operatively and physically coupled to the third interface card of the switch fabric via a midplane. The second interface card defines a plane that is nonparallel to the a plane defined by the third interface card and a plane defined by the midplane. The plane defined by the third interface card is nonparallel to the plane defined by the second interface card and the plane defined by the midplane. The cable is configured to operatively couple the first interface card to the second interface card. In other embodiments, similar to the second housing, the first housing can include two interface cards operatively coupled to each other by a midplane.

As used herein, a switch fabric is a network that includes multiple stages of switches that operatively connect an input device with multiple output devices. A switch fabric is configured to receive an input signal from an input device, forward the signal through the multiple stages of switches, and output the signal to an output device. Each switch of the multiple stages of switches routes the signal such that the signal arrives at its destination. An example of a switch fabric is a Clos network.

In some embodiments, a method includes installing an interface card having a first module of a switch fabric, an interface card having a second module of the switch fabric, and an interface card having a third module of the switch fabric in a first housing within a first time period. In such a manner, a three-stage switch fabric can be formed. In other embodiments, a single interface card includes the first module of the switch fabric and the third module of the switch fabric. The method further includes installing an interface card having a fourth module of the switch fabric and an interface card having a fifth module of the switch fabric in a second housing within a second time period different from the first time period. In other embodiments, a single interface card includes the fourth module of the switch fabric and the fifth module of the switch fabric. The first housing can be coupled to the second housing via cables. The modules within the first housing are operative as a three-stage switch fabric from the first time period through the second time period. The modules within the first housing and the second housing are operative as a five-stage switch fabric after the second time period. In some embodiments, the interface card having the second module of the switch fabric can be moved from the first housing to the second housing within the second time period. In such an embodiment, the interface card having the second module can be operatively coupled to the interface card having the fourth module of the switch fabric and the interface card having the fifth module of the switch fabric via a midplane.

As used herein, a module that is within a switch fabric can be any assembly and/or compilation of electrical components that defines one or more switches within a stage of a switch fabric. An input/output module can be any assembly and/or compilation of electrical components configured to send data to and/or receive data from a switch fabric. In some embodiments, for example, an input/output module can be an access switch configured receive data from a server, prepare data to enter into the switch fabric, and send the data to the switch fabric. In some embodiments, a module can include, for example, a memory, a processor, electrical traces, optical connectors, and/or the like.

In some embodiments, a system includes a multi-stage switch having a first configuration and a second configuration. The multi-stage switch has a first chassis associated with a first stage, a second stage, and a third stage of the multi-stage switch when the multi-stage switch is in the first configuration. The multi-stage switch has a second chassis associated with the second stage, the third stage, and a fourth stage of the multi-stage switch and the first chassis being associated with the first stage and a fifth stage of the multi-stage switch when the multi-stage switch is in the second configuration. The multi-stage switch is expandable from the first configuration to the second configuration while the multi-stage switch operates in the first configuration.

FIG. 1 is a schematic illustration of a switch fabric 100, according to an embodiment. Switch fabric 100 is a three-stage, non-blocking Clos network and includes a first stage 140, a second stage 142, and a third stage 144. The first stage 140 includes modules 112. Each module 112 of the first stage 140 is an assembly of electronic components and circuitry. In some embodiments, for example, each module is an application-specific integrated circuit (ASIC). In other embodiments, multiple modules are contained on a single ASIC. In still other embodiments, each module is an assembly of discrete electrical components.

In some embodiments, each module 112 of the first stage 140 is a cell switch. The cell switches are configured to effectively redirect data as it flows through the switch fabric. In some embodiments, for example, each cell switch includes multiple input ports operatively coupled to write interfaces on a memory buffer. Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) per time period and all output ports to read one outgoing cell per time period. Each cell switch operates similar to a crossbar switch that can be reconfigured subsequent each time period.

In alternate embodiments, each module of the first stage is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

Each module 112 of the first stage 140 includes a set of input ports 160 configured to receive data as it enters the switch fabric 100. In this embodiment, each module 112 of the first stage 140 includes the same number of input ports 160.

Similar to the first stage 140, the second stage 142 of the switch fabric 100 includes modules 114. The modules 114 of the second stage 142 are structurally similar to the modules 112 of the first stage 140. Each module 114 of the second stage 142 is operatively coupled to each module of the first stage 140 by a data path 120. Each data path 120 between each module of the first stage 140 and each module 114 of the second stage 142 is configured to facilitate data transfer from the modules 112 of the first stage 140 to the modules 114 of the second stage 142.

The data paths 120 between the modules 112 of the first stage 140 and the modules 114 of the second stage 142 can be constructed in any manner configured to effectively facilitate data transfer from the modules 112 of the first stage 140 to the modules 114 of the second stage 142. In some embodiments, for example, the data paths are optical connectors between the modules. In other embodiments, the data paths are within a midplane. Such a midplane can be similar to that described in further detail herein. Such a midplane can be effectively used to connect each module of the second stage with each module of the first stage. In still other embodiments, the modules are contained within a single chip package and the data paths are electrical traces.

In some embodiments, the switch fabric 100 is a non-blocking Clos network. Thus, the number of modules 114 of the second stage 142 of the switch fabric 100 varies based on the number of input ports 160 of each module 112 of the first stage 140. In a rearrangeably non-blocking Clos network (e.g., a Benes network), the number of modules 114 of the second stage 142 is greater than or equal to the number of input ports 160 of each module 112 of the first stage 140. Thus, if n is the number of input ports 160 of each module 112 of the first stage 140 and m is the number of modules 114 of the second stage 142, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 144 of the switch fabric 100 includes modules 116. The modules 116 of the third stage 144 are structurally similar to the modules 112 of the first stage 140. The number of modules 116 of the third stage 144 is equivalent to the number of modules 112 of the first stage 140. Each module 116 of the third stage 144 includes output ports 162 configured to allow data to exit the switch fabric 100. Each module 116 of the third stage 144 includes the same number of output ports 162. Further, the number of output ports 162 of each module 116 of the third stage 144 is equivalent to the number of input ports 160 of each module 112 of the first stage 140.

Each module 116 of the third stage 144 is connected to each module 114 of the second stage 142 by a data path 124. The data paths 124 between the modules 114 of the second stage 142 and the modules 116 of the third stage 144 are configured to facilitate data transfer from the modules 114 of the second stage 142 to the modules 116 of the third stage 144.

The data paths 124 between the modules 114 of the second stage 142 and the modules 116 of the third stage 144 can be constructed in any manner configured to effectively facilitate data transfer from the modules 114 of the second stage 142 to the modules 116 of the third stage 144. In some embodiments, for example, the data paths are optical connectors between the modules. In other embodiments, the data paths are within a midplane. Such a midplane can be similar to that described in further detail herein. Such a midplane can be effectively used to connect each module of the second stage with each module of the third stage. In still other embodiments, the modules are contained within a single chip package and the data paths are electrical traces.

Figure 2:
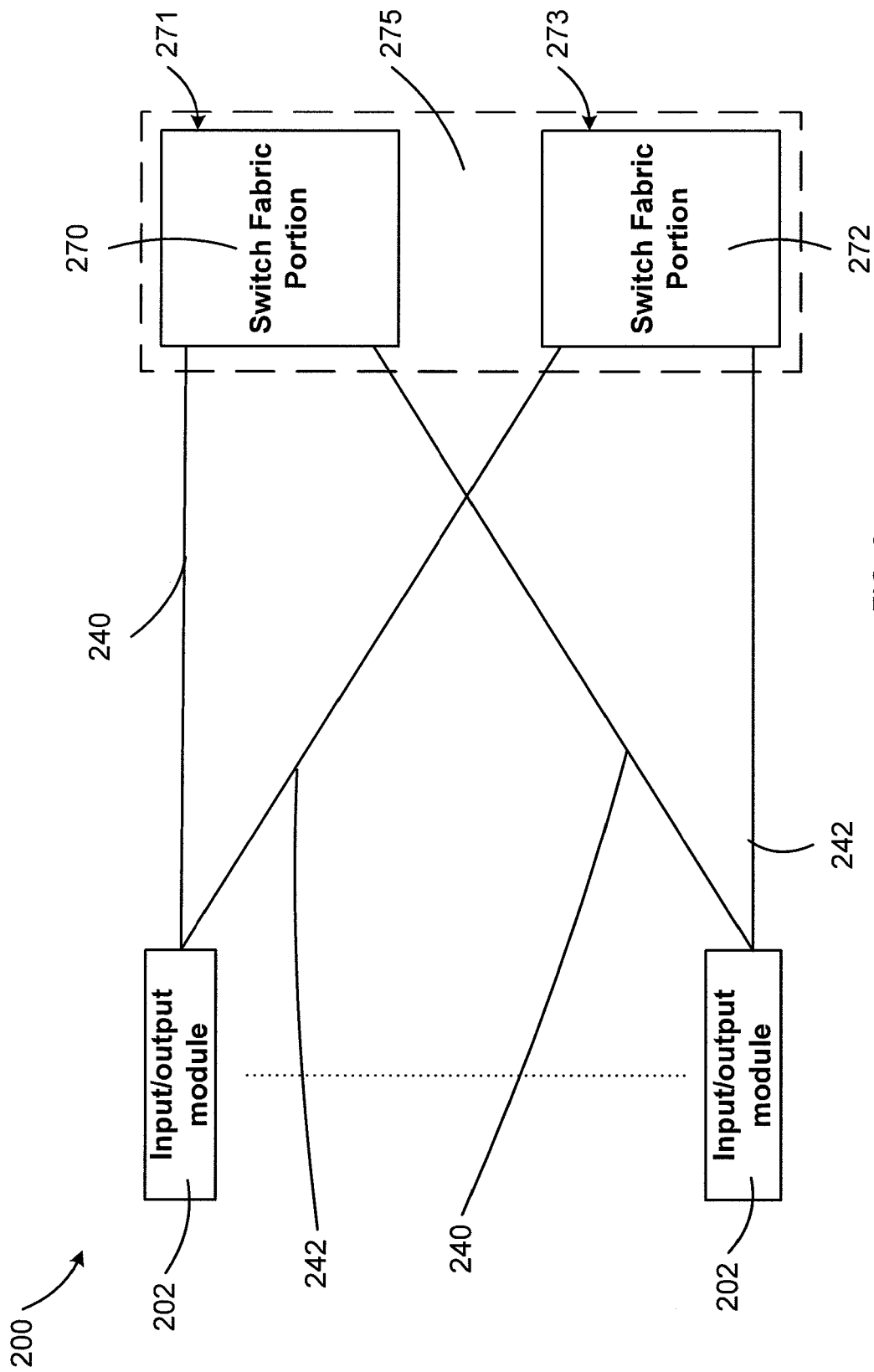
FIG. 2 is a schematic illustration of a system, according to another embodiment.

FIG. 2 is a schematic illustration of a system 200, according to an embodiment. System 200 includes multiple input/output modules 202, a first set of cables 240, a second set of cables 242, and a switch fabric 275. The switch fabric 275 includes a first switch fabric portion 271 disposed within a housing 270 or chassis, and a second switch fabric portion 273 disposed within a housing 272 or chassis.

The input/output modules 202 are configured to send data to and/or receive data from the first switch fabric portion 271 and/or the second switch fabric portion 273. Additionally, each input/output module 202 includes a parsing function, a classifying function, a forwarding function, and a queuing and scheduling function. Thus, packet parsing, packet classifying, packet forwarding, and packet queuing and scheduling all occur prior to a data packet entering the first switch fabric portion 271 and/or the second switch fabric portion 273. Accordingly, these functions do not need to be preformed at each stage of the switch fabric 275, and each module of the switch fabric portions 271, 273 (described in further detail herein) do not need to include capabilities to perform these functions. This reduces the cost, power consumption, cooling requirements and physical area required for each module of the switch fabric portions 271, 273. This also reduces the latency associated with the switch fabric. In some embodiments, for example, the end-to-end latency (i.e., time it takes to send data through the switch fabric from an input/output module to another input/output module) can be lower than the end-to-end latency of a system using an Ethernet protocol. In some embodiments, the throughput of the switch fabric portions 271, 273 is constrained only by the connection density of the system 200 and not by power and thermal limitations. The parsing function, classifying function, forwarding function, and queuing and scheduling function can be performed similar to the functions disclosed in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each input/output module 202 is configured to connect to a first end of a cable of the first set of cables 240 and a first end of a cable of the second set of cables 242. Each cable 240 is disposed between an input/output module 202 and the first switch fabric portion 271. Similarly, each cable 242 is disposed between an input/output module 202 and the second switch fabric portion 273. Using the first set of cables 240 and the second set of cables 242, each input/output module 202 can send data to and/or receive data from the first switch fabric portion 271 and/or the second switch fabric portion 273, respectively.

The first set of cables 240 and the second set of cables 242 can be constructed of any material suitable to transfer data between the input/output modules 202 and the switch fabric portions 271, 273. In some embodiments, for example, each cable 240, 242 is constructed of multiple optical fibers. In such an embodiment, each cable 240, 242 can have twelve transmit and twelve receive fibers. The twelve transmit fibers of each cable 240, 242 can include eight fibers for transmitting data, one fiber for transmitting a control signal, and three fibers for expanding the data capacity and/or for redundancy. Similarly, the twelve receive fibers of each cable 240, 242 have eight fibers for transmitting data, one fiber for transmitting a control signal, and three fibers for expanding the data capacity and/or for redundancy. In other embodiments, any number of fibers can be contained within each cable.

A first switch fabric portion 271 is used in conjunction with a second switch fabric portion 273 for redundancy and/or greater capacity. In other embodiments, only one switch fabric portion is used. In still other embodiments, more than two switch fabric portions are used for increased redundancy and/or greater capacity. For example, four switch fabric portions can be operatively coupled to each input/output module by, for example, four cables. The second switch fabric portion 273 is structurally and functionally similar to the first switch fabric 271. Accordingly, only the first switch fabric portion 271 is described in detail herein.

Figure 3:
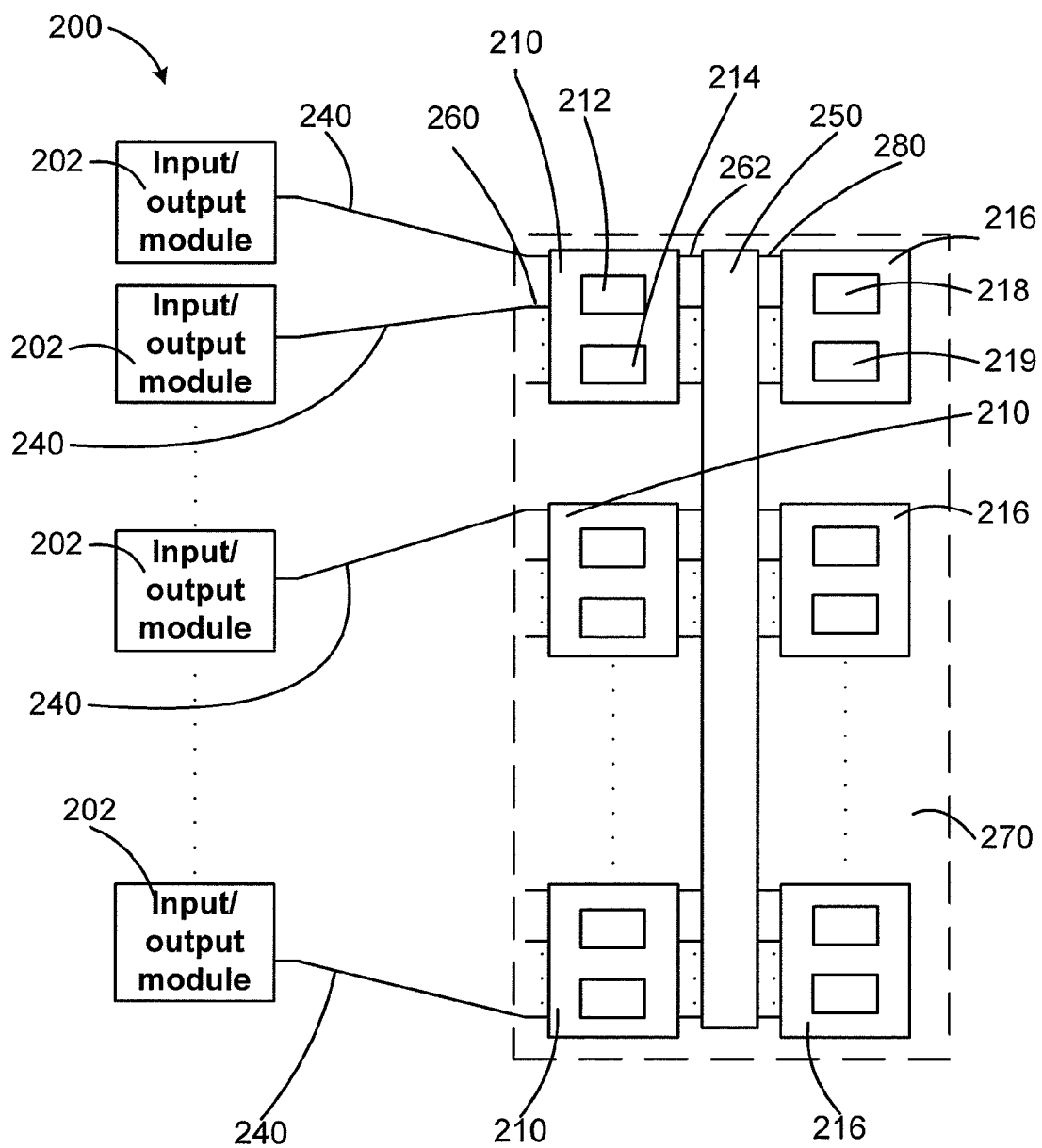
FIG. 3 is a schematic illustration of a portion of the system of FIG. 2.

FIG. 3 shows a portion of the system 200 of FIG. 2 including the first switch fabric portion 271 in greater detail. The first switch fabric portion 271 includes interface cards 210, which are associated with a first stage and a third stage of the first switch fabric portion 271; interface cards 216, which are associated with a second stage of the first switch fabric portion 271; and a midplane 250. In some embodiments, the first switch fabric portion 271 includes eight interface cards 210, which are associated with the first stage and the third stage of the first switch fabric, and eight interface cards 216, which are associated with the second stage of the first switch fabric. In other embodiments, a different number of interface cards associated with the first stage and the third stage of the first switch fabric and/or a different number of interface cards associated with the second stage of the first switch fabric can be used.

As shown in FIG. 3, each input/output module 202 is operatively coupled to an interface card 210 via one of the cables of the first set of cables 240. In some embodiments, for example, each of eight interface cards 210 is operatively coupled to sixteen input/output modules 202, as described in further detail herein. Thus, the first switch fabric portion 271 can be coupled to 128 input/output modules (16×8=128). Each of the 128 input/output modules 202 can send data to and receive data from the first switch fabric portion 271.

Each interface card 210 is connected to each interface card 216 via the midplane 250. Thus, each interface card 210 can send data to and receive data from each interface card 216, as described in further detail herein. Using a midplane 250 to connect the interface cards 210 to the interface cards 216, decreases the number of cables used to connect the stages of the first switch fabric portion 271.

Figure 4:
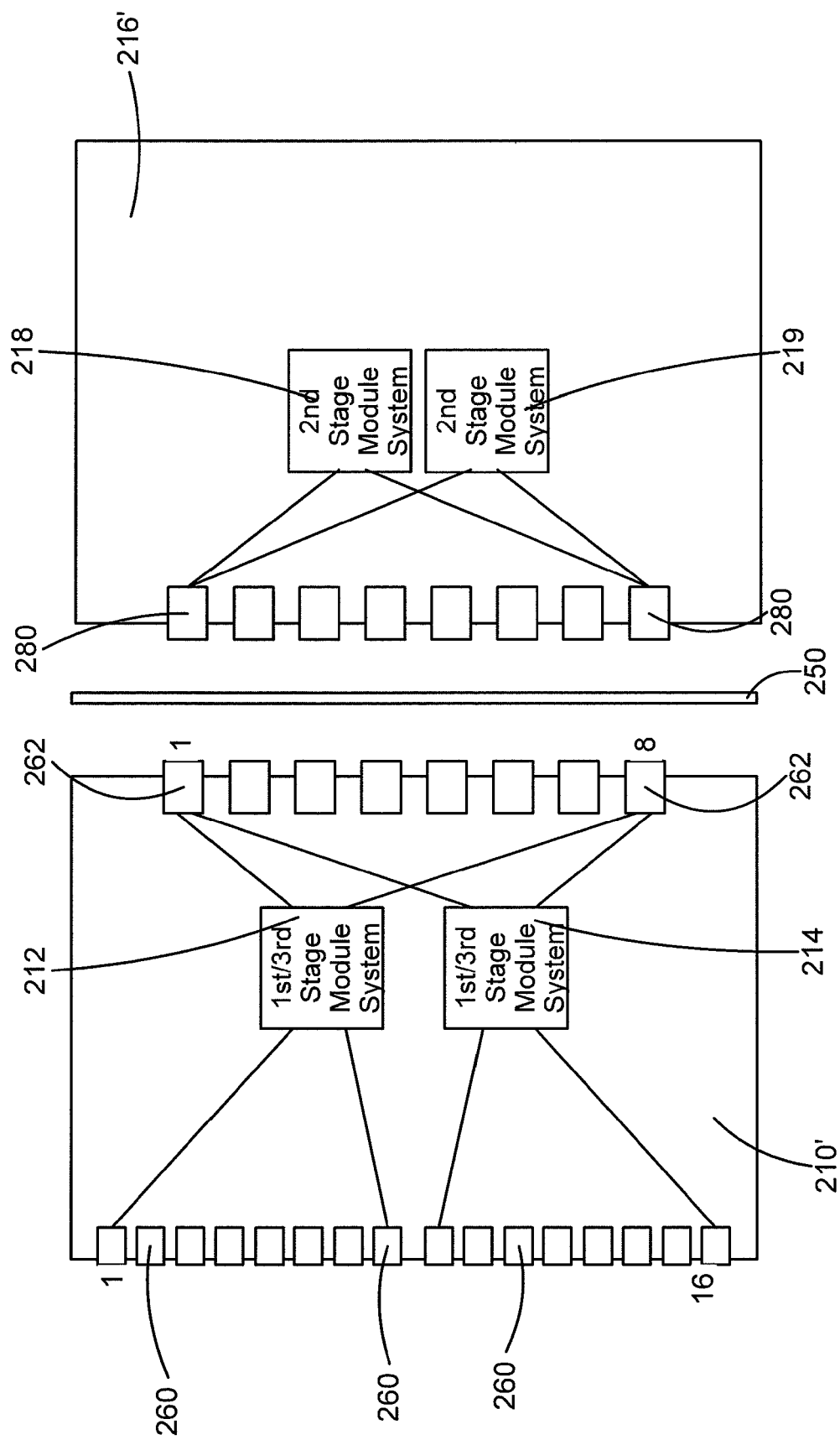
FIG. 4 is a schematic illustration of a portion of the system of FIG. 2.

FIG. 4 shows a first interface card 210', the midplane 250, and a first interface card 216', in greater detail. Interface card 210' is associated with the first stage and the third stage of the first switch fabric portion 271, and interface card 216' is associated with the second stage of the first switch fabric portion 271. Each interface card 210 is structurally and functionally similar to the first interface card 210'. Likewise, each interface card 216 is structurally and functionally similar to the first interface card 216'.

The first interface card 210' includes multiple cable connector ports 260, a first module system 212, a second module system 214, and multiple midplane connector ports 262. For example, FIG. 4 shows the first interface card 210' having sixteen cable connector ports 260 and eight midplane connector ports 262. Each cable connector port 260 of the first interface card 210' is configured to receive a second end of a cable from the first set of cables 240. Thus, as stated above, sixteen cable connector ports 260 on each of the eight interface cards 210 are used to receive the 128 cables (16×8=128). While shown in FIG. 4 as having sixteen cable connector ports 260, in other embodiments, any number of cable connector ports can be used, such that each cable from the first set of cables can be received by a cable connector port in the first switch fabric. For example, if sixteen interface cards are used, each interface card can include eight cable connector ports.

The first module system 212 and the second module system 214 of the first interface card 210' each includes a module of the first stage of the first switch fabric portion 271 and a module of the third stage of the first switch fabric portion 271. In some embodiments, eight cable connector ports of the sixteen cable connector ports 260 are operatively coupled to the first module system 212 and the remaining eight cable connector ports of the sixteen cable connector ports 260 are operatively coupled to the second module system 214. Both the first module system 212 and the second module system 214 are operatively coupled to each of the eight midplane connector ports 262 of interface card 210'.

The first module system 212 and the second module system 214 of first interface card 210' are application-specific integrated circuits (ASICs). The first module system 212 and the second module system 214 are instances of the same ASIC. Thus, manufacturing costs can be decreased because multiple instances of a single ASIC can be produced. Further, a module of the first stage of the first switch fabric portion 271 and a module of the third stage of the first switch fabric are both included on each ASIC.

In some embodiments, each midplane connector port of the eight midplane connector ports 262 has twice the data capacity of each cable connector port of the sixteen cable connector ports 260. Thus, instead of having eight data transmit and eight data receive connections, the eight midplane connector ports 262 each has sixteen data transmit and sixteen data receive connections. Thus, the bandwidth of the eight midplane connector ports 262 is equivalent to the bandwidth of the sixteen cable connector ports 260. In other embodiments, each midplane connector port has thirty-two data transmit and thirty-two data receive connections. In such an embodiment, each cable connector port has sixteen data transmit and sixteen data receive connections.

The eight midplane connector ports 262 of the first interface card 210' are connected to the midplane 250. The midplane 250 is configured to connect each interface card 210 which is associated with the first stage and the third stage of the first switch fabric portion 271, to each interface card 216 which is associated with the second stage of the first switch fabric portion 271. Thus, the midplane 250 ensures that each midplane connector port 262 of each interface card 210 is connected to a midplane connector port 280 of a different interface card 216. Said another way, no two midplane connector ports of the same interface card 210 are operatively coupled to the same interface card 216. Thus, the midplane 250 allows each interface card 210 to send data to and receive data from any of the eight interface cards 216.

Figure 6:
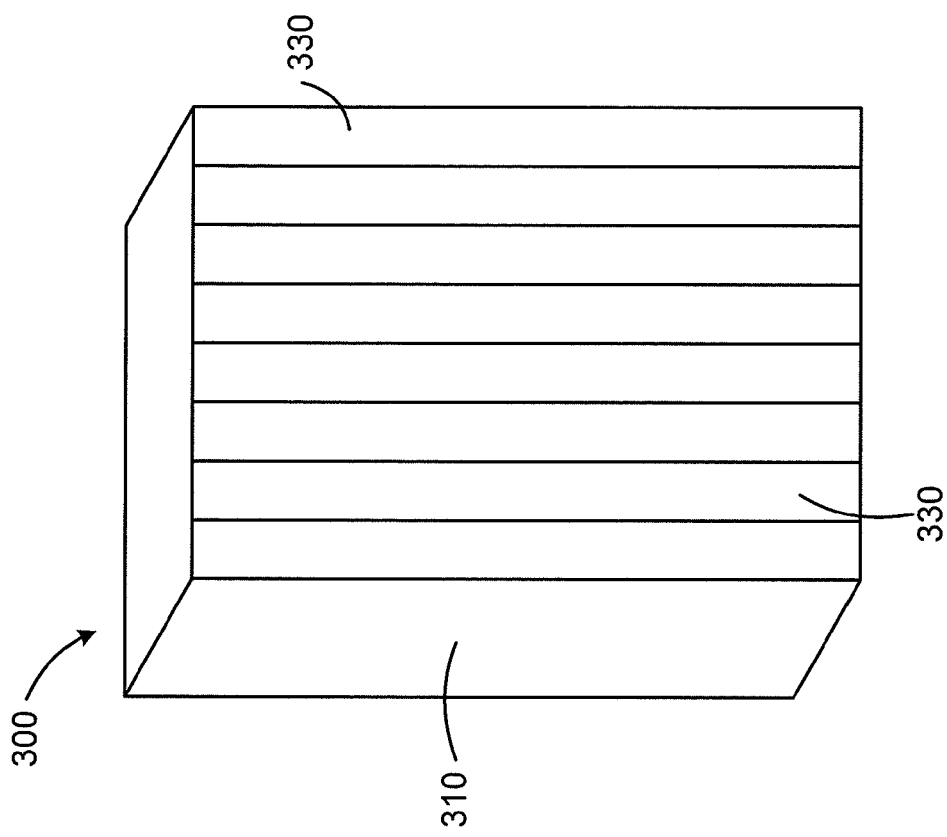
FIGS. 5 and 6 show front and back perspective views respectively, of a housing used to house a switch fabric, according to another embodiment.
Figure 5:
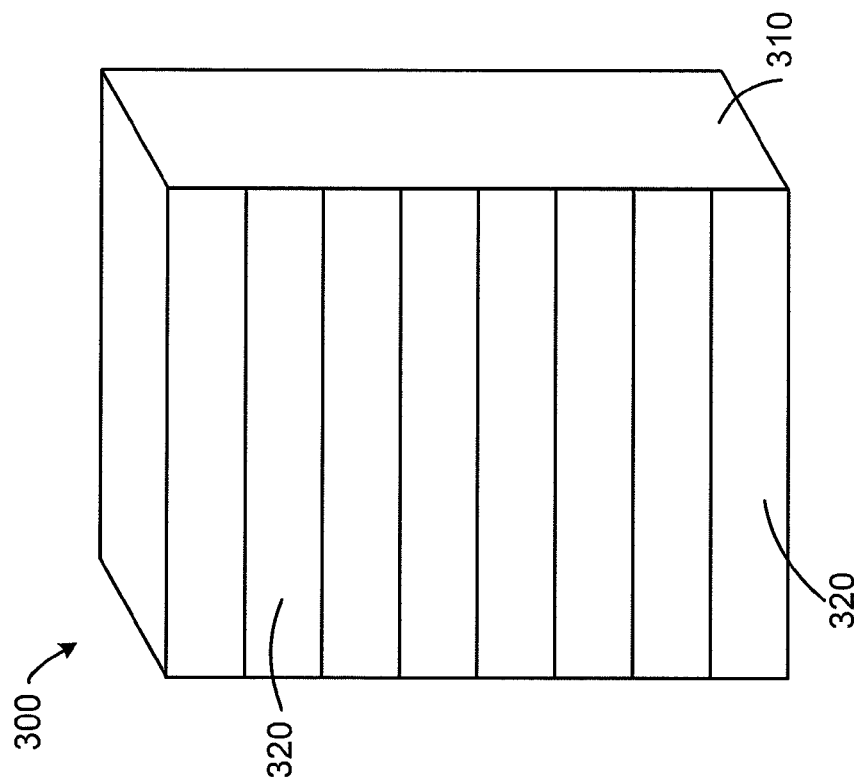
Figure 7:
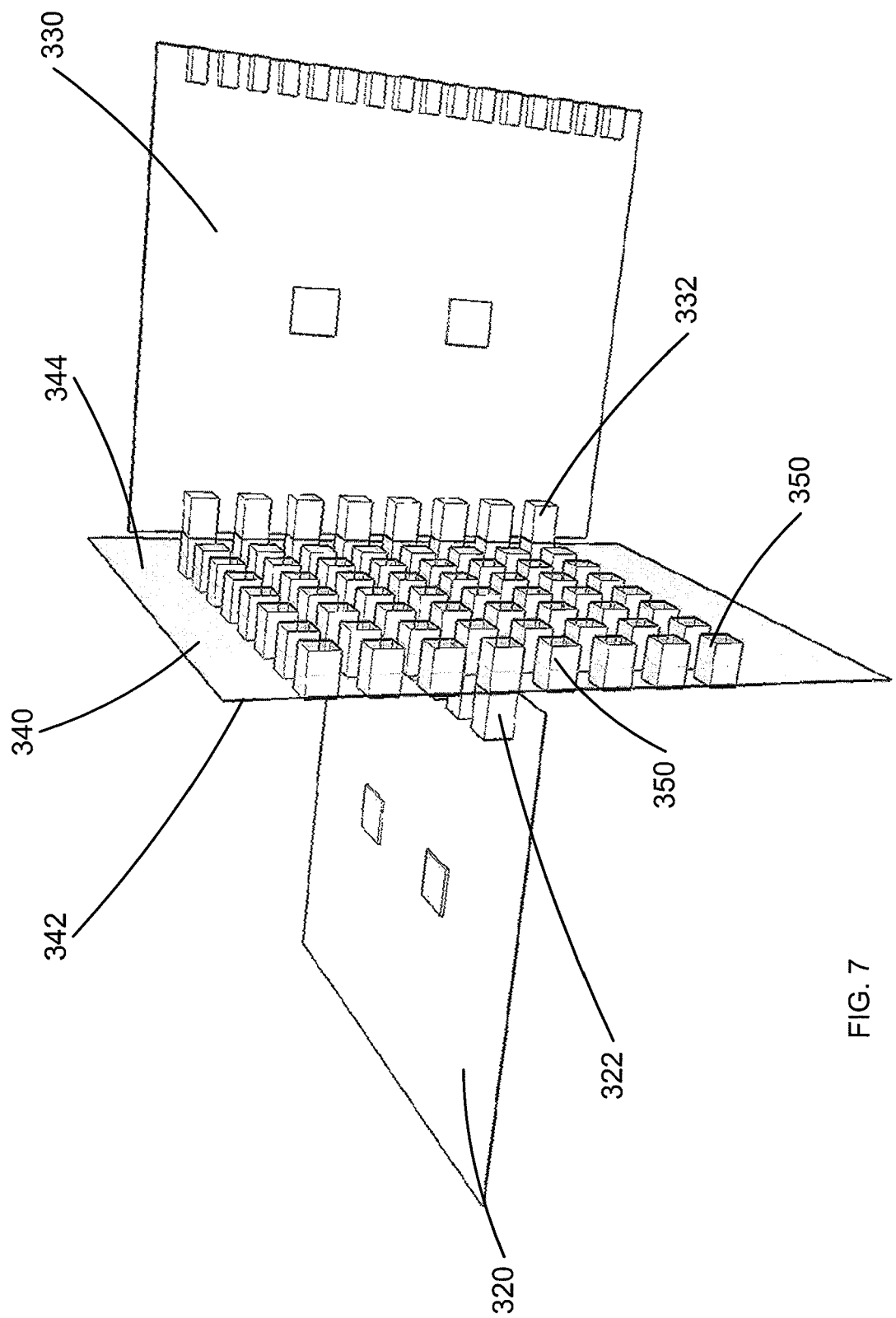
FIG. 7 shows a portion of the housing of FIG. 5.

While FIG. 4 shows a schematic view of the first interface card 210' the midplane 250, and the first interface card 216', in some embodiments, the interface cards 210, the midplane 250, and the interface cards 216 are physically positioned similar to the horizontally positioned interface cards 320, the midplane 340, and vertically positioned interface cards 330, respectively, shown in FIGS. 5-7 and described in further detail herein. Thus, the modules associated with the first stage and the modules associated with the third stage (both on the interface cards 210) are placed on one side of the midplane 250, and the modules associated with the second stage (on the interface cards 216) are placed on the opposite side of the midplane 250. This topology allows each module associated with the first stage to be operatively coupled to each module associated with the second stage, and each module associated with the second stage to be operatively coupled to each module associated with the third stage.

The first interface card 216' includes multiple midplane connector ports 280, a first module system 218, and a second module system 219. The multiple midplane connector ports 280 are configured to send data to and receive data from any of the interface cards 210, via the midplane 250. In some embodiments, the first interface card 216' includes eight midplane connector ports 280.

The first module system 218 and the second module system 219 of the first interface card 216' are operatively coupled to each midplane connector port 280 of the first interface card 216'. Thus, through the midplane 250, each of the module systems 212, 214 associated with the first stage and the third stage of the first switch fabric portion 271 is operatively coupled to each of the module systems 218, 219 associated with the second stage of the first switch fabric portion 271. Said another way, each module system 212, 214 associated with the first stage and the third stage of the first switch fabric portion 271 can send data to and receive data from any of the module systems 218, 219 associated with the second stage of the first switch fabric portion 271, and vice versa. Specifically, a module associated with the first stage within a module system 212 or 214 can send data to a module associated with the second stage within a module system 218 or 219. Similarly, the module associated with the second stage within the module system 218 or 219 can send data to a module associated with the third stage within a module system 212 or 214. In other embodiments, the module associated with the third stage can send data and/or control signals to the module associated with the second stage, and the module associated with the second stage can send data and/or control signals to the module associated with the first stage.

In embodiments where each module of the first stage of the first switch fabric portion 271 has eight inputs (i.e., two modules per each interface card 210), the second stage of the first switch fabric portion 271 can have at least eight modules for the first switch fabric portion 271 to remain rearrangeably non-blocking. Thus, the second stage of the first switch fabric portion 271 has at least eight modules and is rearrangeably non-blocking. In some embodiments, twice the number of modules of the second stage are used to facilitate expansion of the system 200 from a three-stage switch fabric to a five-stage switch fabric, as described in further detail herein. In such a five-stage switch fabric, the second stage supports twice the switching throughput as the second stage within the three-stage switch fabric of the system 200. For example, in some embodiments, sixteen modules of the second stage can be used to facilitate future expansion of the system 200 from a three-stage switch fabric to a five-stage switch fabric.

The first module system 218 and the second module system 219 of first interface card 216' are application-specific integrated circuits (ASICs). The first module system 218 and the second module system 219 are instances of the same ASIC. Additionally, in some embodiments, the first module system 218 and the second module system 219 which are associated with the second stage of the first switch fabric portion 271, are instances of the ASIC also used for the first module system 212 and the second module system 214 of the first interface card 210', which are associated with the first stage and the third stage of the first switch fabric portion 271. Thus, manufacturing costs can be decreased because multiple instances of a single ASIC can be used for each of the module systems in the first switch fabric portion 271.

In use, data is transferred from a first input/output module 202 to a second input/output module 202 via the first switch fabric portion 271. The first input/output module 202 sends data into the first switch fabric portion 271 via a cable of the first set of cables 240. The data passes through a cable connector port 260 of one of the interface cards 210' and into the first stage module within a module system 212 or 214.

The first stage module within the module system 212 or 214 forwards the data to a second stage module within a module system 218 or 219, by sending the data through one of the midplane connector ports 262 of the interface card 210', through the midplane 250, and to one of the interface cards 216'. The data enters the interface card 216' through a midplane connector port 280 of the interface card 216'. The data is then sent to the second stage module within a module system 218 or 219.

The second stage module, determines how the second input/output module 202 is connected and redirects the data back to the interface card 210', via the midplane 250. Because each module system 218 or 219 is operatively coupled to each module system 212 and 214 on interface card 210', the second stage module within the module system 218 or 219 can determine which third stage module within the module system 212 or 214 is operatively coupled to the second input/output module and send the data accordingly.

The data is sent to the third stage module within a module system 212, 214 on the interface card 210'. The third stage module then sends the data to the second input/output module of the input/output modules 202 via a cable of the first set of cables 240 through a cable connector port 260.

In other embodiments, instead of the first stage module sending the data to a single second stage module, the first stage module separates the data into separate portions (e.g., cells) and forwards a portion of the data to each second stage module to which the first stage module is operatively coupled (e.g., in this embodiment, every second stage module receives a portion of the data). Each second stage module then determines how the second input/output module is connected and redirects the portions of the data back to a single third stage module. The third stage module then reconstructs the received portions of the data and sends the data to the second input/output module.

FIGS. 5-7 show a housing 300 (i.e., a chassis) used to house a switch fabric (such as first switch fabric portion 271 described above), according to an embodiment. The housing 300 includes a casing 310, a midplane 340, horizontally positioned interface cards 320 and vertically positioned interface cards 330. FIG. 5 shows a front view of the casing 310 in which eight horizontally positioned interface cards 320 can be seen disposed within the casing 310. FIG. 6 shows a rear view of the casing 310 in which eight vertically positioned interface cards 330 can be seen disposed within the casing 310.

Each horizontally positioned interface card 320 is operatively coupled to each vertically positioned interface card 330 by the midplane 340 (see FIG. 7). The midplane 340 includes a front surface 342, a rear surface 344 and an array of receptacles 350 that connect the front surface 342 with the rear surface 344, as described below. As shown in FIG. 7, the horizontally positioned interface cards 320 include multiple midplane connector ports 322 that connect to the receptacles 350 on the front surface 342 of the midplane 340. Similarly, the vertically positioned interface cards 330 include multiple midplane connector ports 332 that connect to the receptacles on the rear surface 344 of the midplane 340. In this manner, a plane defined by each horizontally positioned interface card 320 intersects a plane defined by each vertically positioned interface card 330.

The receptacles 350 of the midplane 340 operatively couple each horizontally-positioned interface card 320 to each vertically-positioned interface card 330. The receptacles 350 facilitate the transfer of signals between a horizontally-positioned interface card 320 and a vertically-positioned interface card 330. In some embodiments, for example, the receptacles 350 can be multiple-pin connectors configured to receive multiple pin-connectors disposed on the midplane connector ports 322, 332 of the interface cards 320, 330, hollow tubes that allow a horizontally-positioned interface card 320 to directly connect with a vertically-positioned interface card 330, and/or any other device configured to operatively couple two interface cards. Using such a midplane 340, each horizontally-positioned interface card 320 is operatively coupled to each vertically-positioned interface card 330 without routing connections (e.g., electrical traces) on the midplane.

FIG. 7 shows a midplane including a total of 64 receptacles 350 positioned in an 8×8 array. In such an embodiment, eight horizontally-positioned interface cards 320 can be operatively coupled to eight vertically-positioned interface cards 330. In other embodiments, any number of receptacles can be included on the midplane and/or any number of horizontally-positioned interface cards can be operatively coupled to any number of vertically-positioned interface cards through the midplane.

If the first switch fabric portion 271 were housed in housing 300, for example, each interface card 210 associated with the first stage and the third stage of the first switch fabric portion 271 would be positioned horizontally and each interface card 216 associated with the second stage of the first switch fabric portion 271 would be positioned vertically. Thus, each interface card 210 associated with the first stage and the third stage of the first switch fabric portion 271 is easily connected to each interface card 216 associated with the second stage of the first switch fabric portion 271, through the midplane 340. In other embodiments, each interface card associated with the first stage and the third stage of the first switch fabric portion is positioned vertically and each interface card associated with the second stage of the first switch fabric portion is positioned horizontally. In still other embodiments, each interface card associated with the first stage and the third stage of the first switch fabric portion can be positioned at any angle with respect to the housing and each interface card associated with the second stage of the first switch fabric portion can be positioned at an angle orthogonal to the angle of the interface card associated with the first stage and the third stage of the first switch fabric portion with respect to the housing.

Figure 8:
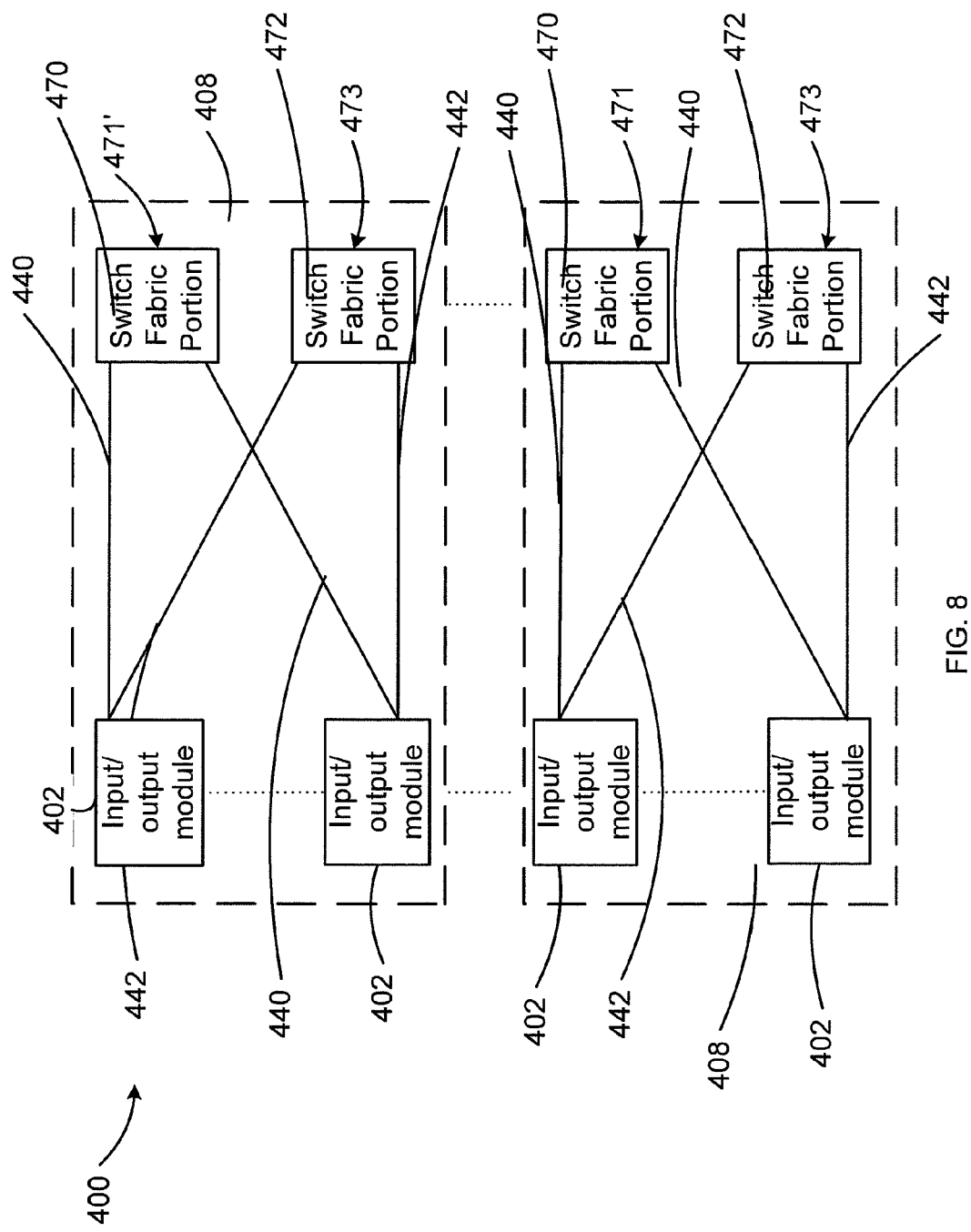
FIGS. 8 and 9 are a schematic illustrations of a system in a first configuration and a second configuration respectively, according to another embodiment.
Figure 9:
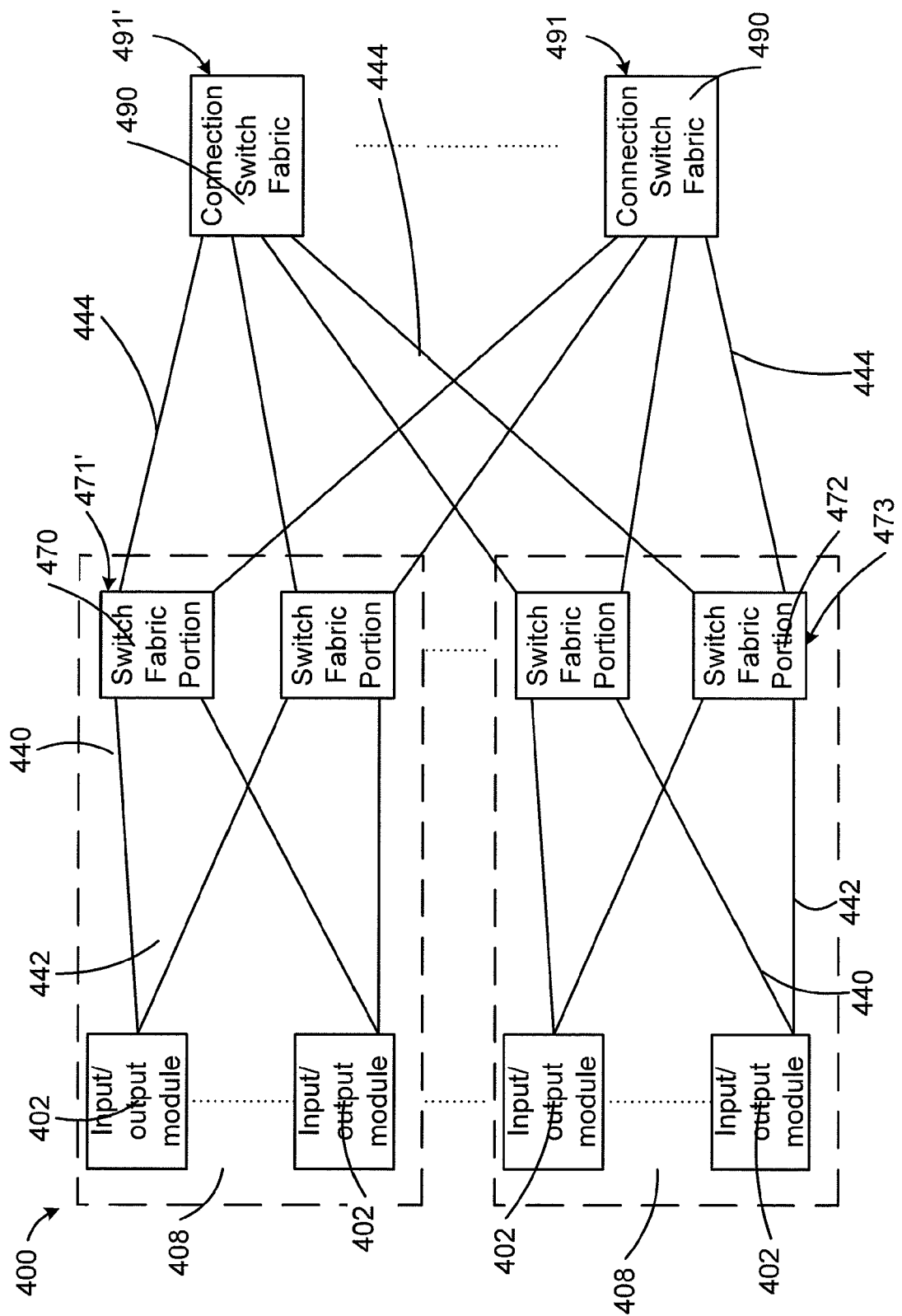

FIGS. 8 and 9 show a schematic illustration of a system 400 in a first configuration and a second configuration, respectively, according to an embodiment. The system 400 includes multiple switch fabric systems 408.

Each switch fabric system 408 includes multiple input/output modules 402, a first set of cables 440, a second set of cables 442, a first switch fabric portion 471 disposed within a housing 470, and a second switch fabric portion 473 disposed within a housing 472. Each switch fabric system 408 is structurally and functionally similar. Further, the input/output modules 402, the first set of cables 440, and the second set of cables 442 are structurally and functionally similar to the input/output modules 202, the first set of cables 240, and the second set of cables 242, respectively.

When the system 400 is in the first configuration, the first switch fabric portion 471 and the second switch fabric portion 473 of each switch fabric system 408 function similar to the first switch fabric portion 271 and the second switch fabric portion 273, described above. Thus, when the system 400 is in the first configuration, the first switch fabric portion 471 and the second switch fabric portion 473 operate as stand-alone three-stage switch fabrics. Accordingly, each switch fabric system 408 acts as a stand-alone switch fabric system and is not operatively coupled to the other switch fabric systems 408 when the system 400 is in the first configuration.

In the second configuration (FIG. 9), the system 400 further includes a third set of cables 444 and multiple connection switch fabrics 491, each disposed within a housing 490. The housing 490 can be similar to the housing 300 described in detail above. Each switch fabric portion 471, 473 of each switch fabric system 408 is operatively coupled to each connection switch fabric 491 via the third set of cables 444. Thus, when the system 400 is in the second configuration, each switch fabric system 408 is operatively coupled to the other switch fabric systems 408 via the connection switch fabrics 491. Accordingly, the system 400 in the second configuration is a five-stage Clos network.

The third set of cables 444 can be constructed of any material suitable to transfer data between the switch fabric portions 471, 473 and the connection switch fabrics 491. In some embodiments, for example, each cable 444 is constructed of multiple optical fibers. In such an embodiment, each cable 444 can have thirty-six transmit and thirty-six receive fibers. The thirty-six transmit fibers of each cable 444 can include thirty-two fibers for transmitting data, and four fibers for expanding the data capacity and/or for redundancy. Similarly, the thirty-six receive fibers of each cable 444 have thirty-two fibers for transmitting data, and four fibers for expanding the data capacity and/or for redundancy. In other embodiments, any number of fibers can be contained within each cable. By using cables having an increased number of optical fibers, the number of cables used can be significantly reduced.

Figure 10:
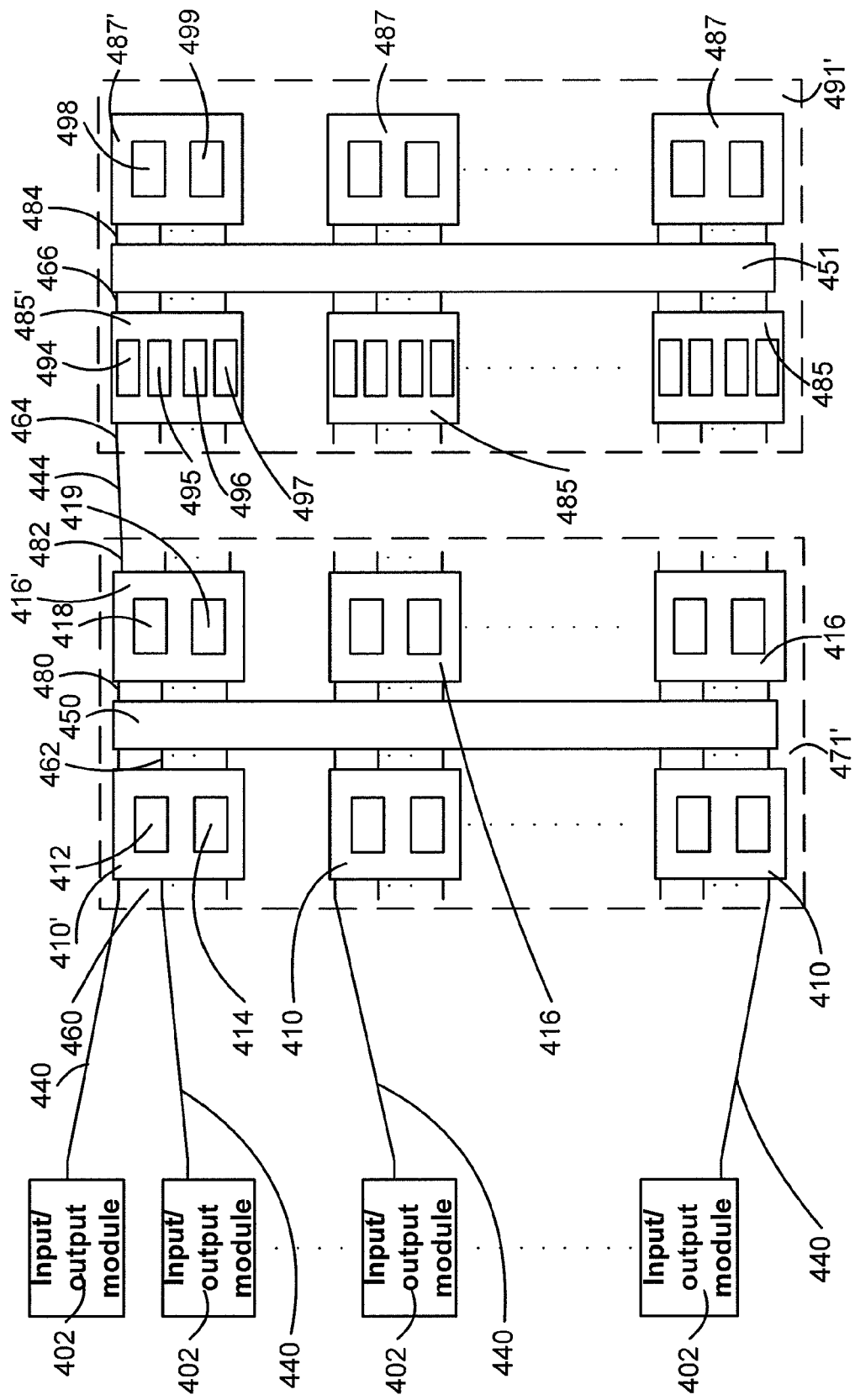
FIG. 10 is a schematic illustration of a portion of the system of FIGS. 9 and 10 in the second configuration.

FIG. 10 shows a segment of a switch fabric portion 471' and a segment of a connection switch fabric 491' when the system 400 is in the second configuration. Each switch fabric portion 471 is structurally and functionally similar to the switch fabric portion 471', and each connection switch fabric 491 is structurally and functionally similar to the connection switch fabric 491'.

The switch fabric portion 471' includes multiple interface cards 410 associated with a first stage and a fifth stage of the system 400 (a portion which is shown in FIG. 10), multiple interface cards 416 associated with a retiming stage of the system 400 (a portion which is shown in FIG. 10), and a midplane 450 configured to operatively couple the interface cards 410 to the interface cards 416. The interface cards 410 associated with a first stage and a fifth stage of the system 400 in the second configuration (FIG. 9) are the same interface cards associated with a first stage and a third stage of the system 400 when the system 400 is in the first configuration (FIG. 8). Similarly, the interface cards 416 associated with the retiming stage of the system 400 in the second configuration (FIG. 9) are the same interface cards associated with a second stage of the system 400 when the system 400 is in the first configuration (FIG. 8). In some embodiments, the switch fabric portion 471' includes eight interface cards 410 and eight interface cards 416. In other embodiments, the switch fabric portion 471' includes a different number of interface cards 410 and/or interface cards 416.

Figure 11:
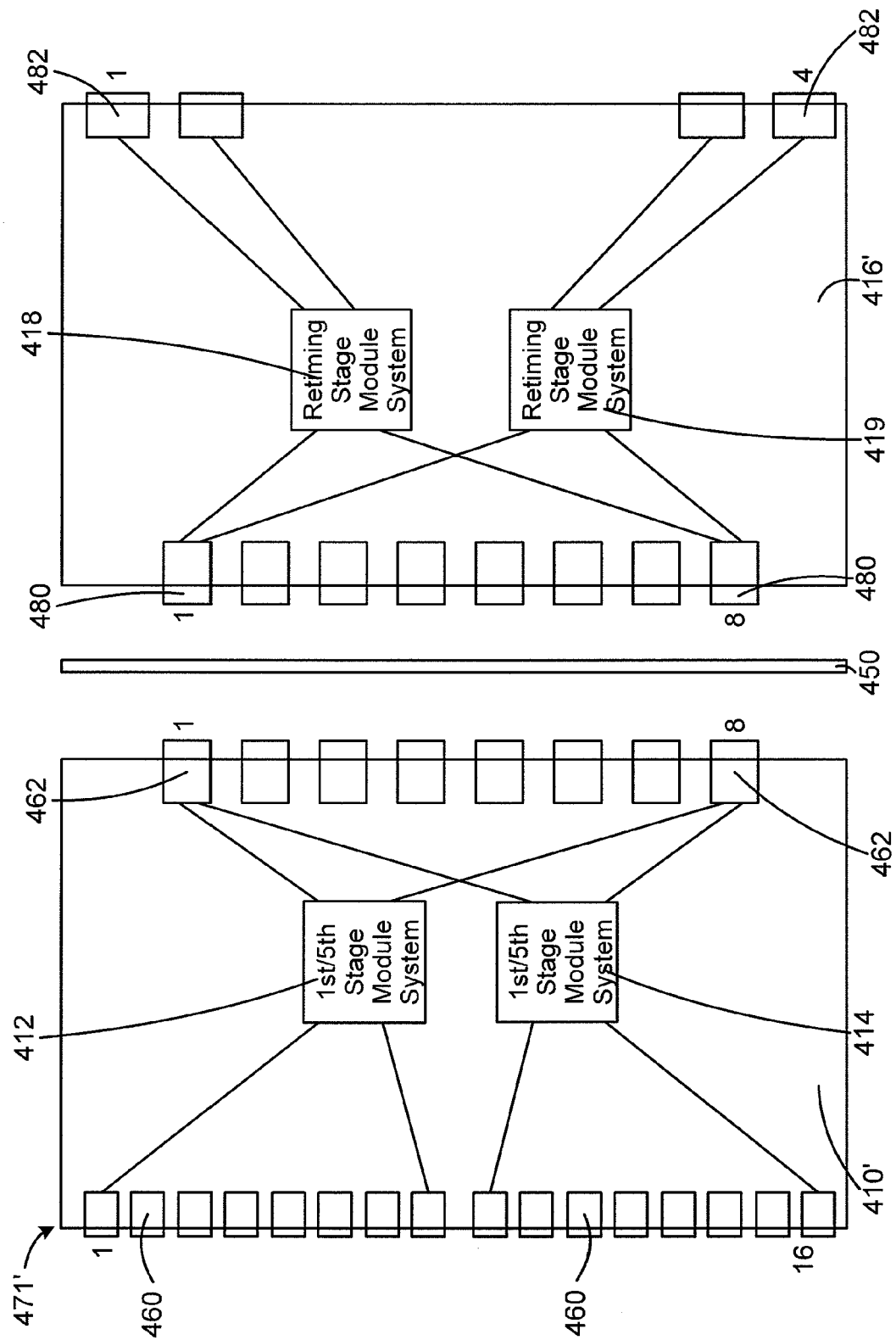
FIG. 11 is a schematic illustration of a portion of the system of FIGS. 9 and 10 in the second configuration.

FIG. 11 shows an interface card 410' associated with the first stage and the fifth stage of the switch fabric system 400, the midplane 450, and an interface card 416' associated with the retiming stage of the switch fabric system 400, in greater detail. The interface card 410' includes multiple cable connector ports 460, a first module system 412, a second module system 414, and multiple midplane connector ports 462. Each cable connector port 460 of interface card 410' is configured to receive a second end of a cable from the first set of cables 440. In some embodiments, for example, the interface card 410' includes sixteen cable connector ports 460. Thus, in such an embodiment, sixteen cable connector ports 460 on each of the eight interface cards 410 are needed to receive the 128 cables (16×8=128). While shown in FIG. 11 as having sixteen cable connector ports 460, in other embodiments, any number of cable connector ports can be used, such that each cable of the first set of cables can be received by a cable connector port in the first switch fabric. For example, if sixteen interface cards are used, each interface card needs to include eight cable connector ports.

The first module system 412 and the second module system 414 of the interface card 410' each includes a module of the first stage and a module of the fifth stage of the switch fabric system 400. In some embodiments, eight cable connector ports of the sixteen cable connector ports 460 are operatively coupled to the first module system 412 and the other eight cable connector ports of the sixteen cable connector ports 460 are operatively coupled to the second module system 414. Both the first module system 412 and the second module system 414 are operatively coupled to each of the midplane connector ports 462 of the interface card 410'.

The first module system 412 and the second module system 414 of the interface card 410' are application-specific integrated circuits (ASICs). The first module system 412 and the second module system 414 are instances of the same ASIC. Thus, manufacturing costs can be decreased because multiple instances of a single ASIC can be produced. Further, a module of the first stage of a module of the fifth stage are both included on each ASIC.

In some embodiments, each midplane connector port 462 has twice the capacity of each cable connector port 460. For example, in some embodiments, the interface card 410 has sixteen cable connector ports 460 and eight midplane connector ports 462. Each cable connector port 460 can receive eight data transmit connections, eight data receive connections, and eight control and/or parity connections. Thus, the sixteen cable connector ports 460 of the interface card 410 collectively include a total of 128 data transmit connections and 128 data receive connections. In such embodiments, each of the eight midplane connector ports 462 within the interface card 410 can contain sixteen data transmit connections and sixteen data receive connections. Thus, the eight midplane connector ports 462 of the interface card 410 collectively include a total of 128 data transmit connections and 128 data receive connections. Accordingly, in such an embodiment, the total bandwidth of the eight midplane connector ports 462 is equivalent to the total bandwidth of the sixteen cable connector ports 460.

In other embodiments, the total bandwidth of the midplane connector ports can be twice the total bandwidth of the cable connector ports. In such embodiments, each midplane connector port can have, for example, thirty-two data transmit connections and thirty-two data receive connections. Thus, the eight midplane connector ports of the interface card collectively include a total of 256 data transmit connections and 256 data receive connections. Accordingly, the midplane connector ports of the interface card can support twice the bandwidth of the cable connector ports. In such embodiments, the same midplane can be used for both the switch fabric portions 471 and the connection switch fabrics 491.

The eight midplane connector ports 462 of the interface card 410' are connected to the midplane 450. The midplane 450 is configured to connect each interface card 410 to each interface card 416. Thus, the midplane 450 ensures that each midplane connector port 462 of each interface card 410 is operatively coupled to a midplane connector port 480 of a different interface card 416 via the midplane 450. Said another way, no two midplane connector ports of the same interface card 410 are operatively coupled to the same interface card 416. Thus, the midplane 450 allows each interface card 410 to send data to and receive data from any of the interface cards 416.

The interface card 416' includes multiple midplane connector ports 480, a first module system 418, a second module system 419, and multiple cable connector ports 482. The midplane connector ports 480 are configured to send data to and receive data from any of the interface cards 410 associated with the first stage and the fifth stage of the switch fabric system 400, via the midplane 450. In some embodiments, the interface card 416' includes eight midplane connector ports 480 and four cable connector ports 482. Further, when the system 400 is in the first configuration, the cable connector ports 482 are not used.

The first module system 418 and the second module system 419 of the interface card 416' are operatively coupled to each midplane connector port 480. Thus, through the midplane 450, each module system 412, 414 associated with the first stage and the fifth stage of the system 400 is operatively coupled to each module system 418, 419 associated with the retiming stage of the switch fabric system 400. Said another way, each module system 412, 414 can send data to and receive data from any module system 418, 419, and vice versa.

When the system 400 is in the second configuration (see FIG. 9), the cable connector ports 482 of the interface card 416' associated with the retiming stage of the system 400 are configured to be coupled to the third set of cables 444. This enables the interface card 416' to forward data to and/or from the connection switch fabrics 491. Additionally, the retiming stage of the system 400 is configured to retime and/or multiplex signals.

Each cable connector port 482 of the switch fabric portion 471' is operatively coupled to a different connection switch fabric 491. In other embodiments, multiple cable connector ports of the switch fabric portion can be operatively coupled to the same connection switch fabric. In such embodiments, each connection switch fabric can be connected to the same number of cable connector ports. Thus, the connections between the cable connector ports of the switch fabric portion are evenly distributed across the cable connector ports of the connection switch fabrics.

In some embodiments, for example, the system 400 includes 32 connection switch fabrics 491. If such an embodiment includes eight interface cards 410 and eight interface cards 416 in the switch fabric portion 471', the first module system 412 and the second module system 414 of the interface card 410' associated with the first stage and the fifth stage of the three-stage system 400 are both operatively coupled to each connection switch fabric 491 via the midplane 450, the module systems 418, 419 associated with the retiming stage, and the third set of cables 444.

The first module system 418 and the second module system 419 of interface card 416' are application-specific integrated circuits (ASICs). The first module system 418 and the second module system 419 are instances of the same ASIC. Additionally, in some embodiments, the first module system 418 and the second module system 419 are instances of the ASIC used for the first module system 412 and the second module system 414 of interface card 410'. Thus, manufacturing costs can be decreased because multiple instances of a single ASIC can be used for each of the module systems in the switch fabric portion 471'.

Each connection switch fabric 491 includes interface cards 485 associated with a second stage and a fourth stage of the switch fabric system 400, interface cards 487 associated with a third stage of the switch fabric system 400, and a midplane 451 connecting the interface cards 485 to the interface cards 487. In some embodiments, the connection switch fabric 491 includes eight interface cards 485 and eight interface cards 487. In other embodiments, any number of interface cards associated with the various stages of the switch fabric system can be used.

Figure 12:
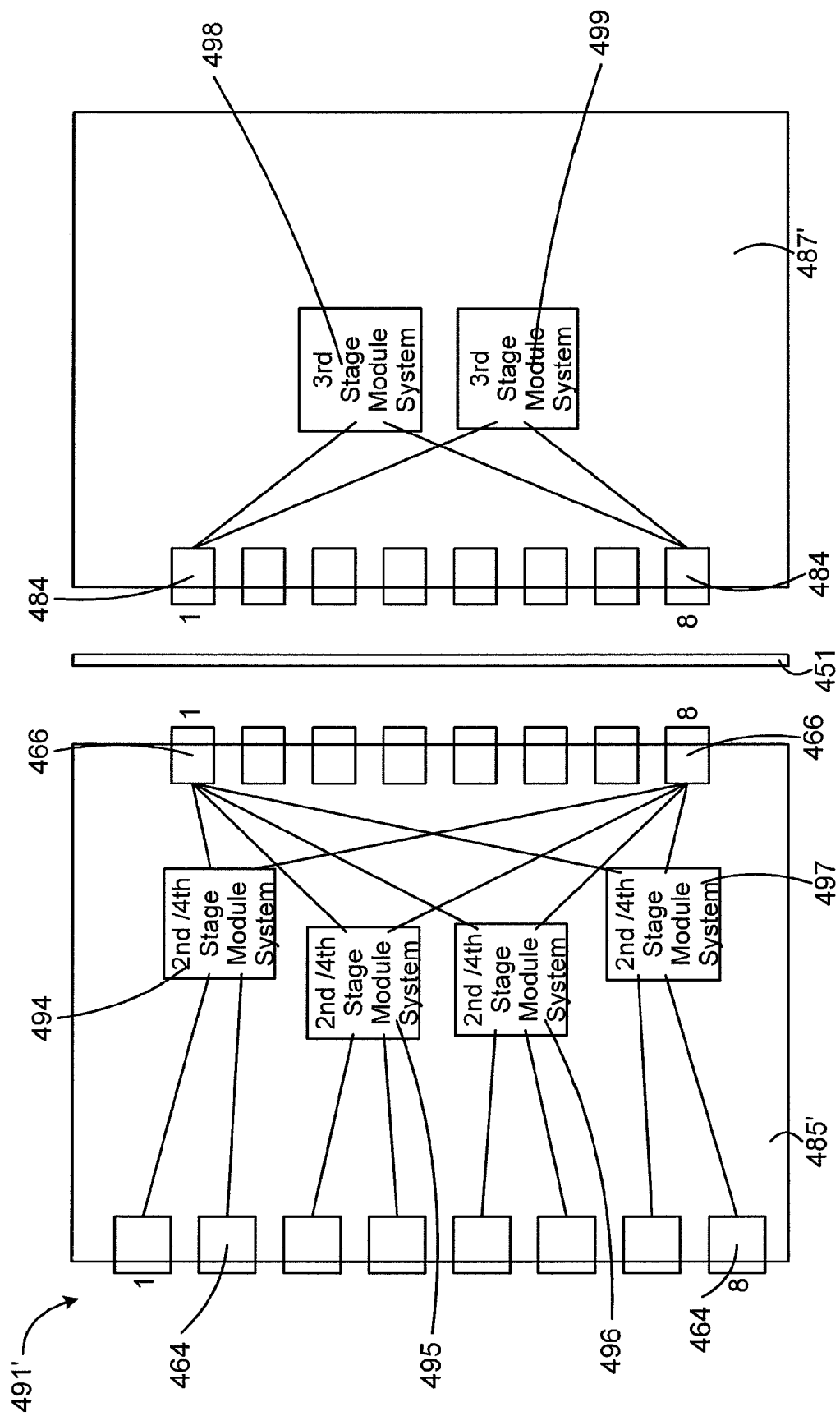
FIG. 12 is a schematic illustration of a portion of the system of FIGS. 9 and 10 in the second configuration.

FIG. 12 shows a portion of a connection switch fabric 491' in greater detail. Specifically, FIG. 12 shows an interface card 485' associated with the second stage and the fourth stage of the switch fabric system 400, an interface card 487' associated with a third stage of the switch fabric system 400, and a midplane 451 configured to operatively couple each interface card 485 with each interface card 487.

The interface card 485' includes multiple cable connector ports 464, a first module system 494, a second module system 495, a third module system 496, a fourth module system 497, and multiple midplane connector ports 466. Each cable connector port 464 of interface card 485' is configured to receive a second end of a cable of the third set of cables 444. In some embodiments, as stated above, eight cable connector ports 464 on each of the eight interface cards 485 are needed to receive 64 cables 444 from the cable connector ports 482 of the interface cards 416. While shown in FIG. 12 as having eight cable connector ports 464, in other embodiments, any number of cable connector ports can be used, such that each cable of the third set of cables can be received by a cable connector port associated with an interface card associated with the second stage and the fourth stage of the switch fabric system. For example, if sixteen interface cards are used, each interface card needs to include four cable connector ports.

The first module system 494, the second module system 495, the third module system 496, and the fourth module system 497 of the interface card 485' associated with the second stage and the fourth stage of the system 400 each include a module of the second stage and a module of the fourth stage of the switch fabric system 400. In some embodiments, two cable connector ports are operatively coupled to each of the module systems 494, 495, 496, 497. Each of the module systems 494, 495, 496, 497 are operatively coupled to each of the midplane connector ports 466 of interface card 485'.

The module systems 494, 495, 496, 497 of the interface card 485' are application-specific integrated circuits (ASICs). The module systems 494, 495, 496, 497 are instances of the same ASIC. Thus, manufacturing costs can be decreased because multiple instances of a single ASIC can be produced. Further, a module of the second stage and a module of the fourth stage are both included on each ASIC.

In some embodiments, each midplane connector port 466 has equal data capacity of each cable connector port 464. In such an embodiment, the interface card 485' has eight cable connector ports 464 having 72 connections. In such an embodiment, the 72 connections can include 32 data transmit connections, 32 data receive connections and 8 control and/or parity connections. Each midplane connector port 466 can similarly contain 32 data transmit connections and 32 data receive connections. Thus, the bandwidth of the midplane connector ports 466 is equivalent to the bandwidth of the cable connector ports 464. In other embodiments, the total bandwidth of the midplane connector ports is higher than the total bandwidth of the cable connector ports.

The midplane 451 is configured to connect each interface card 485 to each interface card 487, which is associated with the third stage of the switch fabric system 400. Thus, the midplane 451 ensures that each midplane connector port 466 of the interface card 485' is connected to a midplane connector port 484 of a different interface card 487 associated with the third stage of the switch fabric system 400. Said another way, no two midplane connector ports 484 of the interface card 485' are operatively coupled to the same interface card 487 associated with the third stage of the switch fabric system 400. Thus, the midplane 451 allows each interface card 485 to send data to and receive data from any of the interface cards 487.

The interface card 487' includes multiple midplane connector ports 484, a first module system 498, and a second module system 499. The multiple midplane connector ports 484 are configured to send data to and receive data from any of the interface cards 485 associated with the second stage and the fourth stage of the switch fabric system 400, via the midplane 451.

The first module system 498 and the second module system 499 of the interface card 487' are operatively coupled to each midplane connector port 484 of the interface card 487'. Thus, through the midplane 451, each module system 494, 495, 496, 497 associated with the second stage and the fourth stage of the switch fabric system is operatively coupled to each module system 498, 499 associated with the third stage of the switch fabric system 400. Said another way, each module system 494, 495, 496, 497 can send data to and receive data from any of the module systems 498, 499, and vice versa. Additionally, each module system 498, 499 includes a module associated with the third stage of the switch fabric system 400.

The first module system 498 and the second module system 499 of interface card 487' are application-specific integrated circuits (ASICs). The first module system 498 and the second module system 499 are instances of the same ASIC. Additionally, in some embodiments, the first module system 498 and the second module system 499 are instances of the ASIC used for the other module systems in the switch fabric system 400. Thus, manufacturing costs are decreased because multiple instances of a single ASIC can be used for each of the module systems in the switch fabric system 400.

By using cables having an increased number of data connections (e.g., optical fibers) and/or midplanes to operatively couple the modules of the various stages, the number of cables used can be significantly reduced. For example, in an embodiment that is rearrangeably non-blocking (i.e., each stage has the same number of modules) and has 4096 input/output modules, if a cable including eight data connections is used to connect each of the modules of a five-stage switch fabric (i.e., input to first stage, first stage to second stage, etc.), 24,576 cables are needed. Alternatively, if midplanes are used as described above, the cables connecting the second stage modules with the third stage modules and the cables connecting the third stage modules with the fourth stage modules can be eliminated. Thus, 16,384 cables can be used. Further, if each input connection and each output connection from the same input/output module are combined into a single cable (i.e., a 16 data connection cable), and each connection between each first stage module and each second stage module is combined with a connection between the fourth stage module on the same interface card as the second stage module and the fifth stage module on the same interface card as the first stage module (i.e., 32 data connection cables), the number of cables used can be reduced to 10,240.

As stated above, when in the first configuration, each switch fabric system 408 functions substantially similar to the system 200. By reconfiguring the system 400 from the first configuration to the second configuration, the system 400 expands from a three-stage switch fabric to a five-stage switch fabric. Further, additional input/output modules 402 can be added to the system 400 as its capacity expands when reconfigured from the first configuration to the second configuration. In some embodiments, for example, when in the first configuration, a given input/output module can send data to any of 127 other input/output modules. When in the second configuration, the same input/output module can send data to any of 4095 other input/output modules.

The system 400 can be reconfigured from the first configuration (FIG. 8) to the second configuration (FIG. 9) by connecting the third set of cables 444 between the switch fabric portions 471, 473 of the switch fabric systems 408 and each connection switch fabric 491. This initial step can be done while each switch fabric system 408 is operating in the first configuration. Thus, minimal and/or no network downtime is required to expand an existing switch fabric.

Once the third set of cables 444 is connected, the module systems 418, 419 within each interface card 416 associated with the second stage of the system 400 when in the first configuration can be reconfigured to be associated with the retiming stage of the switch fabric system 400. Once this is done, each of the three-stage switch fabric portions 471, 473 ceases to operate in the first configuration and the switch fabric system is in the second configuration.

Figure 13:
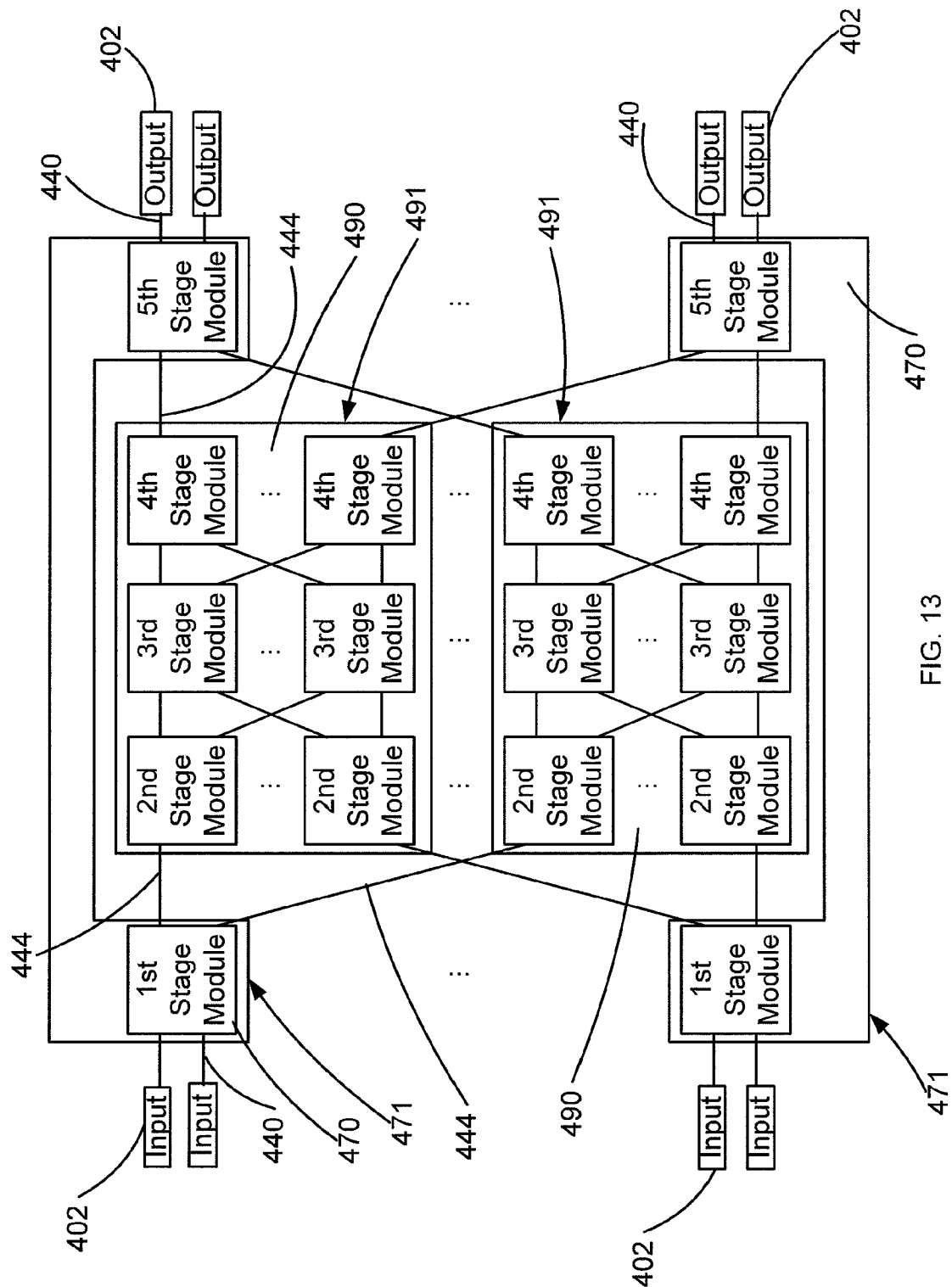
FIG. 13 is a schematic illustration of the system of FIGS. 9 and 10 in the second configuration.

When in the second configuration, data is transferred from a first input/output module of the input/output modules 402 to a second input/output module of the input/output modules 402 via the switch fabric system 400. FIG. 13 shows a data flow path through the stages of the switch fabric system 400.

The first input/output module 402 sends data into one of the switch fabric portions 471, 473 of one of the switch fabric systems 408 via a cable of the first set of cables 440. The data passes through a cable connector port 460 of one of the interface cards 410 and into a module associated with a first stage of the system 400 within a module system 412 or 414.

The module associated with the first stage forwards the data to one of the modules associated with the second stage of the system 400 via the retiming stage of the switch fabric system 400. This is done by sending the data through one of the midplane connector ports 462 of the interface card 410', through the midplane 450, and to one of the interface cards 416 associated with the retiming stage. The data is received at the interface card 416 through a midplane 480. The data is then sent to the module within the module system 418 or 419.

The module associated with the retiming stage of the system 400 determines to which connection switch fabric 491 to send the data and sends the data to a module within the second stage of the system 400 within a module system 494, 495, 496 or 497 contained within the connection switch fabric 491 via a cable connector port 482, a cable of the third set of cables 444, and a cable connector port 464.

The module associated with the second stage sends the data to a module associated with a third stage within a module system 498 or 499 via the midplane connector ports 466, the midplane 451, and the midplane connector ports 484.

The module associated with the third stage determines where the second input/output module of the input/output modules 402 is located within the system 400 and redirects the data back to the interface card 485, via the midplane 451. Because each module system 498, 499 (associated with the third stage of the switch fabric system 400) is operatively coupled to each module system 412, 414 (associated with the first stage and the fifth stage of the switch fabric system 400) via the module systems 494, 495, 496, 497 (associated with the second stage and the fourth stage of the switch fabric system 400) and the module systems 418, 419 (associated with the retiming stage of the switch fabric system 400), the module system 498, 499 associated with the third stage of the system 400 can determine which module system 412, 414 (associated with the first stage and the fifth stage of the switch fabric system 400) is operatively coupled to the second input/output module and send the data accordingly. In such a manner, the data is sent from the module associated with the third stage to the second input/output module 402 via the module associated with the fourth stage within a module system 498 or 499, the module associated with the retiming stage within a module system 418 or 419 and the module associated with the fifth stage within a module system 412 or 414.

In other embodiments, instead of the first stage module sending the data to a single second stage module, the first stage module separates the data into separate data portions (e.g., cells) and forwards a data portion to each second stage module to which the first stage module is operatively coupled. Each second stage module further separates the data portion received and sends a part of the data portion received to each third stage module (e.g., in this embodiment, every third stage module receives a part of a data portion). Each third stage module then determines how the second input/output module is connected and accordingly redirects the part of the data portion to a fourth stage module. Each part of a particular data portion is sent to the same fourth stage module such that the data portion can be reconstructed from its parts. Each fourth stage module then sends the data portion to a fifth stage module. Each data portion is sent to the same fifth stage module such that the data can be reconstructed from its portions. The fifth stage module then reconstructs the received data portions and sends the data to the second input/output module.

While the first stage of the system 400 can send data to the second stage of the system 400 via the retiming stage, in some embodiments, the second stage cannot send data to the first stage. Similarly, in such an embodiment, the fifth stage cannot send data to the fourth stage, the fourth stage cannot send data to the third stage, and the third stage cannot send data to the second stage.

Figure 14:
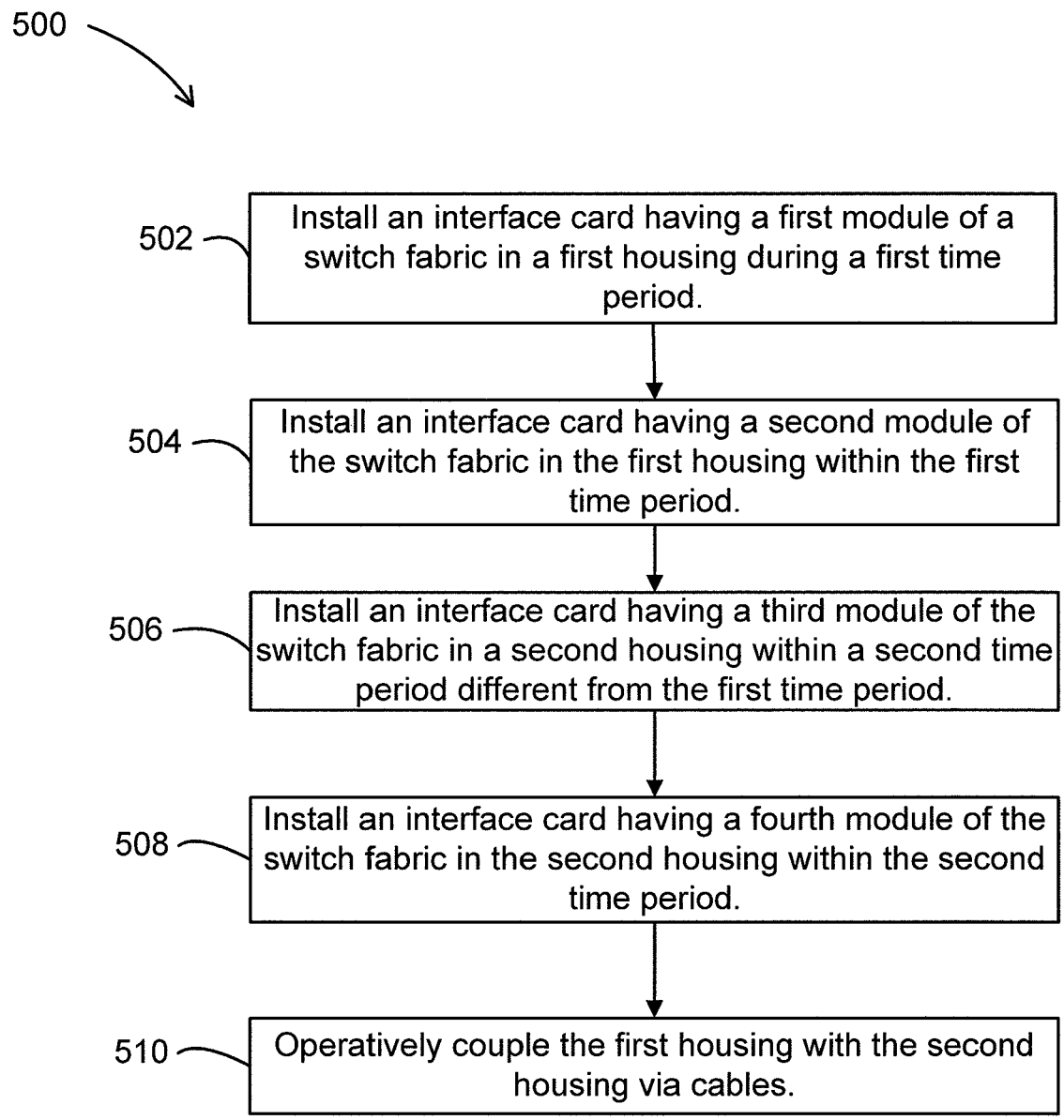
FIG. 14 is a flow chart illustrating a method, according to another embodiment.

FIG. 14 is a flow chart illustrating a method 500 of installing a system such as system 400, according to an embodiment. The method 500 includes installing an interface card having a first module of a switch fabric in a first housing during a first time period, at 502. An interface card having a second module of the switch fabric is then installed in the first housing within the first time period, at 504. After the first time period, the system can operate in a first configuration. In some embodiments, the system operates as a three-stage switch fabric when in the first configuration. During a second time period, different from the first time period, an interface card having a third module of the switch fabric is installed in a second housing, at 506. An interface card having a fourth module of the switch fabric is installed in the second housing within the second time period, at 508. The first housing is then operatively coupled with the second housing via cables, at 510. After the second time period, the system can operate in a second configuration. In some embodiments, the system operates as a five stage switch fabric when in the second configuration.

While FIGS. 8-12 show the interface card associated with the second stage of the first configuration as the same interface card associated with the retiming stage of the second configuration, in other embodiments, these interface cards can be separate. In such an embodiment, the system is moved from the first configuration to the second configuration by removing the interface cards associated with the second stage of the first configuration and replacing them with interface cards associated with the retiming stage of the second configuration. This can be done incrementally (e.g., one card at a time) such that the overall switch fabric system can continue to operate while the interface cards associated with the second stage are replaced by the interface cards associated with the retiming stage. Additionally, in such an embodiment, the interface cards associated with the second stage of the first configuration can be used as the interface cards associated with the third stage of the second configuration. Said another way, once the interface cards associated with the second stage in the first configuration are removed from the housing of the switch fabric portion, these interface cards can be put into the housing of the connector switch fabric to be used as the interface cards associated with the third stage in the second configuration.

Using separate interface cards for the second stage of the first configuration and the retiming stage of the second configuration can decrease cost. The interface card associated with the second stage of the first configuration does not include cable connector ports. The interface card associated with the retiming stage of the second configuration includes cable connector ports. In some embodiments, the cable connector ports are expensive optical connectors. Thus, using interface cards without cable connector ports when the switch fabric system is in the first stage, reduces the cost of the interface cards used in the switch fabric system in the first stage.

Figure 15:
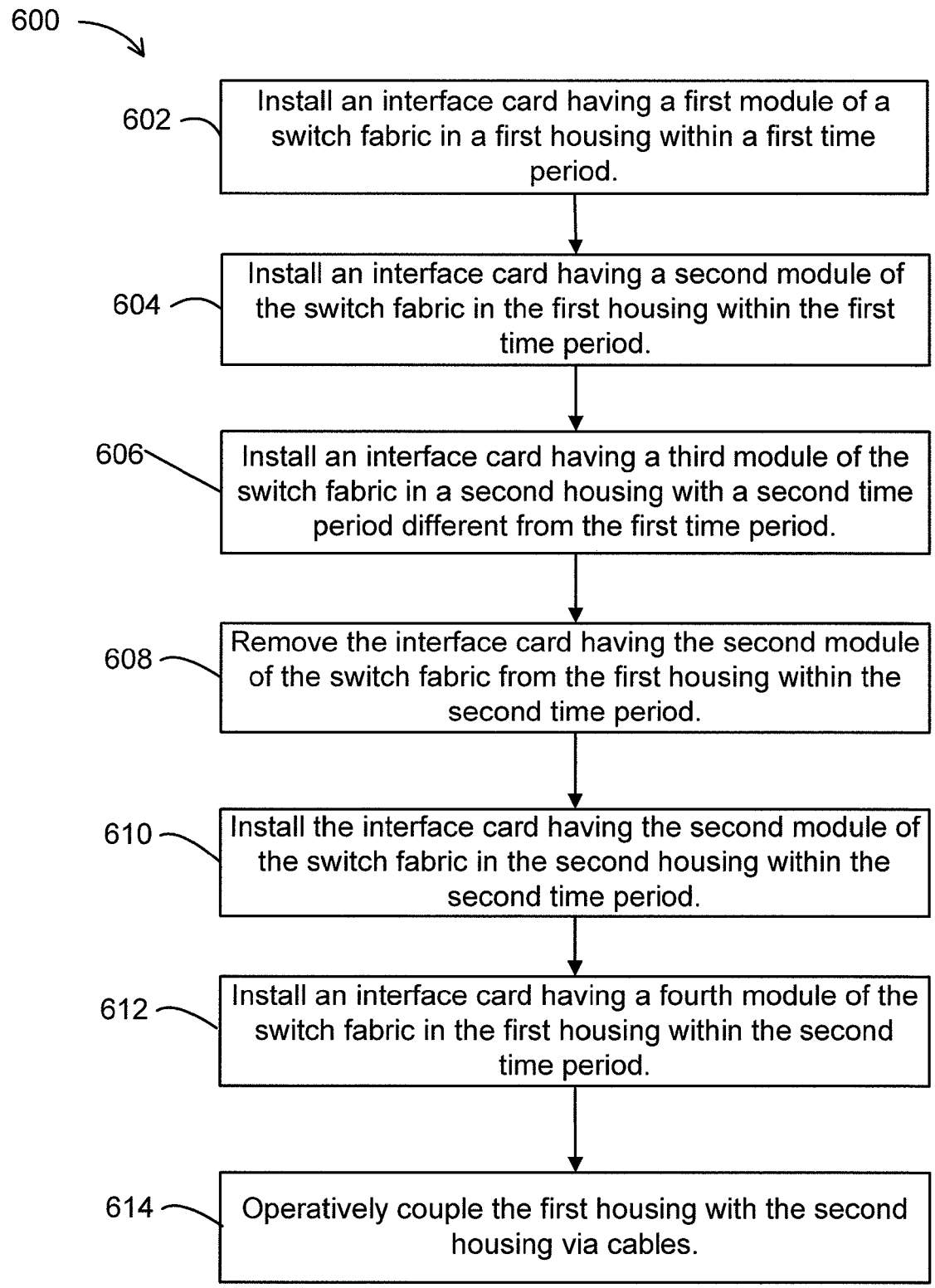
FIG. 15 is a flow chart illustrating a method, according to another embodiment.

FIG. 15 is a flow chart illustrating a method 600 of installing a system using separate interface cards for the second stage of the first configuration and the retiming stage of the second configuration. The method 600 includes installing an interface card having a first module of a switch fabric in a first housing within a first time period, at 602. An interface card having a second module of the switch fabric is then installed in the first housing within the first time period, at 604. After the first time period, the system can operate in a first configuration. In some embodiments, the system operates as a three-stage switch fabric when in the first configuration. During a second time period, different from the first time period, an interface card having a third module of the switch fabric is installed in a second housing, at 606. The interface card having the second module of the switch fabric is removed from the first housing within the second time period, at 608, and installed in the second housing within the second time period, at 610. An interface card having a fourth module of the switch fabric is then installed in the first housing within the second time period, at 612. In some embodiments, the interface card having the fourth module is installed in a position where the interface card having the second module was previously positioned. The first housing is then operatively coupled with the second housing via cables, at 614. After the second time period, the system can operate in a second configuration. In some embodiments, the system operates as a five-stage switch fabric when in the second configuration.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

For example, while the systems and methods described above have been described in relation to a strictly non-blocking Clos network and a rearrangeably non-blocking Clos network (e.g., a Benes network), the systems and methods can be used with any type of switch fabric and/or network.

In some embodiments, each cable connector port, each midplane connector port, each cable and/or each midplane described above can have any bandwidth necessary to send data through the switch fabric. For example, each cable can have eight data connections, sixteen data connections, thirty-two data connections and/or the like. Similarly, each cable connector port, each midplane connector port, and/or each midplane can have eight data connections, sixteen data connections, thirty-two data connections and/or the like. In some embodiments, each cable connector port, each midplane connector port, each cable and/or each midplane do not all have the same number of data connections. In other embodiments, each cable connector port, each midplane connector port, each cable and/or each midplane have the same number of data connections.

In other embodiments, for example, a switch fabric system can have any number of stages. For example, while the switch fabric systems discussed herein have three or five stages, in other embodiments, the switch fabric system can have seven, nine, eleven, or more stages. This allows the switch fabric system to expand to include additional input/output modules. Additionally, a larger switch fabric system is capable of transferring greater amounts of data.

While the systems shown and described above use a midplane to operatively couple a first set of interface cards to a second set of interface cards within a housing, in other embodiments, a midplane is not needed. For example, in some embodiments, each interface card from the first set of interface cards directly interfaces with each interface card from the second set of interface cards. In some embodiments, for example, a given interface card from the first set of interface cards can be directly coupled to eight interface cards from the second set of interface cards. Similarly, a given interface card from the second set of interface cards can be directly coupled to eight interface cards from the first set of interface cards. In such embodiments, each interface card from the first set of interface cards can send data to each interface card from the second set of interface cards without using a midplane and/or cables.

In other embodiments, free space optics can be used instead of a midplane to operatively couple a first set of interface cards to a second set of interface cards within a housing. In such embodiments, for example, each interface card can include multiple light sources, such as, for example, vertical-cavity surface-emitting lasers (VCSELs) and multiple light sensors, such as, for example, a PIN array containing multiple PIN diodes. A light source on an interface card from the first set of interface cards is aligned with a light sensor on an interface card from the second set of interface cards, and vice versa. In some embodiments, for example, each of eight light sources on an interface card from the first set of interface cards can be aligned with a light sensor from each of eight interface cards from the second set of interface cards. Similarly, each of eight light sources on an interface card from the second set of interface cards can be aligned with a light sensor from each of eight interface cards from the first set of interface cards. Accordingly, using free space optics, data can be transferred between the first set of interface cards and the second set of interface cards without using a midplane, cables (including optical connectors or fibers) and/or the like.

Although various embodiments have been described as having particular features and/or combinations of components, other embodiments are possible having a combination of any features and/or components from any of embodiments where appropriate. For example, where a specific number of modules, interface cards and/or connections has been described, any suitable number of modules, interface cards and/or connections can be used, Further, in any of the described embodiments, modules of each stage of the switch fabric can be within a separate interface card and/or a separate ASIC within an interface card. In other embodiments, multiple stages and/or modules can be included on the same interface card and/or ASIC. Additionally, any of the data paths and/or cables can have any suitable bandwidth.

What is claimed is:

1. A method, comprising:
    activating a first plurality of interface cards in a first housing within a first time period, the first plurality of interface cards being associated with multiple stages of a switch fabric, the switch fabric being in a first configuration after the first time period and before a second time period;
    activating a second plurality of interface cards in a second housing within the second time period while the switch fabric operates in the first configuration, the second plurality of interface cards being associated with multiple stages of the switch fabric, at least one interface card from the second plurality of interface cards within the second time period having been an interface card from the first plurality of interface cards during the first time period; and
    operatively coupling the first housing with the second housing within the second time period to define a second configuration of the switch fabric after the second time period, the number of stages associated with the second configuration being greater than the number of stages associated with the first configuration.

2. The method of claim 1, further comprising:
sending data from the first plurality of interface cards to the second plurality of interface cards during the second time period.

3. The method of claim 1, wherein a first interface card from the first plurality of interface cards defines a plane relative to the first housing after the activating the first plurality of interface cards, a second interface card from the first plurality of interface cards defines a plane relative to the first housing after the activating the second plurality of interface cards, the plane of the first interface card being nonparallel to the plane of the second interface card.

4. The method of claim 1, wherein a first interface card from the first plurality of interface cards is coupled to a second interface card from the first plurality of interface cards via a midplane connector after the activating the first plurality of interface cards.

5. The method of claim 1, wherein the first plurality of interface cards is associated with a first stage, a second stage and a third stage of the switch fabric after the first time period and before the second time period.

6. The method of claim 1, wherein the first plurality of interface cards is associated with a first stage, a retiming stage, and a fifth stage of the switch fabric, after the second time period.

7. The method of claim 1, wherein the switch fabric is a three-stage switch fabric after the first time period and before the second time period, the switch fabric is a five-stage switch fabric after the second time period.

8. A method, comprising:
installing an interface card having a first module system of a switch fabric in a first housing within a first time period;
installing an interface card having a second module system of the switch fabric in the first housing within the first time period, the switch fabric being in a first configuration after the first dine period and before a second time period;
installing an interface card having a third module system of the switch fabric in a second housing within the second time period, the switch fabric in operation during the second time period;
removing the interface card having the second module system of the switch fabric from the first housing within the second time period;
installing the interface card having the second module system of the switch fabric in the second housing within the second time period;
installing an interface card having a fourth module system of the switch fabric in the first housing within the second time period; and
operatively coupling the first housing with the second housing within the second time period to define a second configuration of the switch fabric after the second time period.

9. The method of claim 8, wherein the second module system is associated with a second stage of the switch fabric after the first time period and before the second time period, the second module system being associated with a third stage of the switch fabric after the second time period.

10. The method of claim 8, wherein the first module system is associated with a first stage and a third stage of the switch fabric after the first time period and before the second time period, the first module system being associated with the first stage and a fifth stage of the switch fabric after the second time period.

11. The method of claim 8, wherein the switch fabric is a three-stage switch fabric after the first time period and before the second time period, the switch fabric is a five-stage switch fabric after the second time period.

12. The method of claim 8, wherein the fourth module system is configured to forward data from a first stage of the switch fabric to a second stage of the switch fabric after the second time period.

13. A method, comprising:
removing an interface card from a first chassis within a switch fabric while the switch fabric is in operation, the switch fabric configured in three stages before the removing; and
installing the interface card in a second chassis, the first chassis and the second chassis collectively defining a switch fabric configured in five stages after the installing, the switch fabric being operative after the installing such that data can be sent from the first chassis to the second chassis.

14. The method of claim 13, wherein the switch fabric configured in three stages continues to operate after the removing and before the installing.

15. The method of claim 13, wherein the interface card is a first interface card, the first chassis including a second interface card, the second interface card being associated with a first stage and a third stage of the switch fabric configured in three stages, the second interface card being associated with a first stage and a fifth stage of the switch fabric configured in five stages.

16. The method of claim 13, wherein the interface card is associated with a second stage of the switch fabric configured in three stages, the interface card being associated with a third stage of the switch fabric configured in five stages.

17. The method of claim 13, wherein the interface card is a first interface card, the method further comprising:
installing a second interface card in the first chassis after the removing the first interface card from the first chassis, the second interface card being associated with a retiming stage of the switch fabric configured in five stages.

18. The method of claim 13, wherein the switch fabric configured in five stages has at least one cable interconnecting the first chassis with the second chassis.

* * * * *